(12) United States Patent
Gray

(10) Patent No.: US 10,976,237 B2
(45) Date of Patent: Apr. 13, 2021

(54) DEVICE FOR MEASURING AND TESTING FOOTWEAR TRACTION

(71) Applicant: Heeluxe, LLC, Goleta, CA (US)

(72) Inventor: Geoffrey Gray, Santa Barbara, CA (US)

(73) Assignee: Heeluxe, LLC, Goleta, CA (US)

( * ) Notice: Subject to any disclaimer, the term of this patent is extended or adjusted under 35 U.S.C. 154(b) by 371 days.

(21) Appl. No.: 16/222,747

(22) Filed: Dec. 17, 2018

(65) Prior Publication Data

US 2019/0369005 A1  Dec. 5, 2019

Related U.S. Application Data

(60) Provisional application No. 62/678,193, filed on May 30, 2018.

(51) Int. Cl.
| | | |
|---|---|---|
| *G01N 19/02* | (2006.01) | |
| *G01N 3/56* | (2006.01) | |
| *A43B 5/00* | (2006.01) | |

(52) U.S. Cl.
CPC ............... *G01N 19/02* (2013.01); *A43B 5/00* (2013.01); *G01N 3/56* (2013.01)

(58) Field of Classification Search
CPC .................................. G01N 19/02; G01N 3/56
See application file for complete search history.

(56) References Cited

U.S. PATENT DOCUMENTS

| | | | |
|---|---|---|---|
| 2,638,776 A * | 5/1953 | Aines ........................ | G01N 3/56 73/7 |
| 3,975,940 A | 8/1976 | Brungraber | |
| 4,081,989 A | 4/1978 | Majcherczyk | |
| 4,096,733 A | 6/1978 | Cohen | |
| 4,130,007 A | 12/1978 | Hayashi | |

(Continued)

FOREIGN PATENT DOCUMENTS

| | | |
|---|---|---|
| EP | 0332848 | 9/1989 |
| EP | 2578102 | 4/2013 |

(Continued)

OTHER PUBLICATIONS

European Patent Office, European search report, Cianci Sabino, EP 12165812, dated Jan. 29, 2013, 2 pages, The Hague.
International search report, PCT/JP2009/056269, 3 pages.

*Primary Examiner* — Jill E Culler
*Assistant Examiner* — Ruben C Parco, Jr.
(74) *Attorney, Agent, or Firm* — Kevin Schraven; Anooj Patel; Hankin Patent Law, APC

(57) ABSTRACT

A shoe traction testing and measuring device, comprising a base frame, a rear leg assembly, a front leg assembly, a hip joint, and a piston. The piston is connected to the base frame and the rear leg assembly. A lower portion of the rear leg assembly is connected to the base frame and an upper portion of the rear leg assembly is connected to an upper portion of the front leg assembly at the hip joint. The front leg assembly comprises an articulating ankle and a replica foot, which is configured to don a shoe to be tested. When the piston actuates forward, the upper portion of the rear leg assembly tilts forward, which causes the front leg assembly to move forward and downward, simulating a step of a human, which causes the shoe on the replica foot to contact a force plate or a surface that is on top of the force plate.

20 Claims, 23 Drawing Sheets

(56) References Cited

U.S. PATENT DOCUMENTS

| | | | |
|---|---|---|---|
| 4,327,572 | A | 5/1982 | Pitman |
| 4,432,223 | A | 2/1984 | Paquette |
| 4,813,266 | A | 3/1989 | Nash |
| 5,259,236 | A * | 11/1993 | English .................. G01N 19/02 73/9 |
| 6,854,316 | B2 | 2/2005 | Hage |
| 8,573,028 | B2 | 11/2013 | Chen |
| 9,464,980 | B2 | 10/2016 | Yngve |
| 2012/0240660 | A1 * | 9/2012 | Johnson ........... G01N 35/00693 73/9 |
| 2018/0289290 | A1 * | 10/2018 | Suzuki ................. A61B 5/6828 |

FOREIGN PATENT DOCUMENTS

| | | |
|---|---|---|
| JP | 2775408 | 7/1998 |
| WO | 01/85402 | 11/2001 |
| WO | 2009119795 | 10/2009 |

\* cited by examiner

US 10,976,237 B2

DEVICE FOR MEASURING AND TESTING FOOTWEAR TRACTION

CROSS-REFERENCE TO RELATED APPLICATIONS

This application claims the benefit of U.S. Provisional Patent Application No. 62/678,193, filed on May 30, 2018, titled "DEVICE FOR MEASURING FOOTWEAR TRACTION", by inventor Geoffrey Gray, the contents of which are expressly incorporated herein by this reference as though set forth in its entirety and to which priority is claimed.

FIELD OF USE

The present disclosure relates generally to devices, systems, and methods that measure the traction of an object. More specifically, the present disclosure relates to a footwear traction measuring and testing device that accurately generates the loading and speed characteristics of a human footstep and decreases the time between test runs.

BACKGROUND

Traction may refer to the maximum tractive force between a body and a surface and limited by available friction. Traction may be expressed as the ratio of the maximum tractive force to the normal force and is often referred to as coefficient of traction. The coefficient of traction may be defined as the usable force for traction divided by the weight on the surface contact object (shoe, wheel, etc.). The Usable traction=coefficient of traction times Normal Force.

There are several factors that may affect the coefficient of traction, which are:
- The material composition of each of the two tractive surfaces.
- Macroscopic and microscopic texture/shape
- The Normal Force pressing the two tractive surfaces together.
- Contaminants at the material boundary, including lubricants (liquids, liquid films, loose particulates (dirt or gravel) and adhesives
- Relative motion between the two tractive surfaces—a sliding object (one in kinetic friction) has less traction than a non-sliding object (one in static friction).
- Direction of traction relative to some coordinate system (e.g., the available traction of a tire/shoe often differs between cornering, accelerating, and braking).
- For low-friction surfaces, such as off-road or ice, traction can be increased by using traction devices that partially penetrate the surface; these devices use the shear strength of the underlying surface rather than relying solely on dry friction (e.g., aggressive off-road tread or snow chains).

The American Society for Testing and Materials (ASTM) provides guidelines for shoe traction testing, including ASTM F2333, Standard Test Method for Traction Characteristics of the Athletic Shoe-Sports Surface Interface (https://www.astm.org/Standards/F2333.htm). But, these guidelines and devices prior to the present disclosure fail to disclose testing systems, methods and devices that accurately generate the loading and speed characteristics of a human footstep. Additionally, devices other than the device of the present disclosure take too long to reset, thus requiring significant time to run each test and then reset the machine for the next testing run.

There is, thus, a need in the art for a shoe traction measuring device, system, and method that more accurately measures the traction of the footwear by mimicking the loading and speed characteristics of a human footstep.

SUMMARY

To minimize the limitations in the cited references, and to minimize other limitations that will become apparent upon reading and understanding the present specification, the present specification discloses a new and improved footwear traction testing device, method, and system.

In one embodiment the device of the present disclosure simulates the movement of a human step or gait in order to measure the traction of a shoe on various surfaces. Preferably, the device of the present disclosure meets specific characteristics, which may include different ranges of speed, mass, and angles of the front leg of a human with respect to 90-degree vertical position. Controlling these specific characteristics may allow a user to adjust the parameters needed for each test, thereby generating data that will allow for the creation of better gripping shoes.

In a preferred embodiment, the device of the present disclosure simulates the movement of a human step by comprising a front leg and foot assembly and a rear leg and foot portion. As the rear leg and foot portion are moved forward by the actuator or piston, the front leg and foot assembly is moved downward, such that the front foot assembly contacts the testing force plate and any surface that is covering the force plate.

In one embodiment of the device of the present disclosure the device may have the following engineering characteristics so as to provide an accurate human step/slip simulation:
  Leg Angle Range: 10°-20°
  Ankle Angle: 2°-30°
  Walking Speed (COM Velocity): 1.0-1.3 m/s
  Body Weight: 130-180 lbs.
  Inverted Pendulum Walking Motion: Yes
  Allow For Slipping Motion: Yes In one embodiment the shoe traction testing device of the present invention replicates the force curves generated by a human step/slip. Based on the biomechanics of the human gait the device of the present disclosure may have a high biofidelity and may also be adjustable in order to produce the load profiles needed for accurate simulation. An inverted pendulum may serve as a model to analyze the human gait. A human's weight may be modeled as a point mass that is concentrated at the top of an inverted pendulum, represented by the human's legs, and may oscillate during the transfer of the weight from one step to the other. The device of the present invention may provide for shoe traction testing that is repeatable, adjustable, and has a high biofidelity.

In one embodiment, the device of the present disclosure may allow for the adjustment of the testing parameters, including: setting/changing the angles of the legs; setting/changing the angles of the ankle; adding or removing weight, including at the waist/hip; and setting/changing the walking speed (via the piston or actuator).

One embodiment of the traction testing device and system of the present disclosure may be a shoe traction testing and measuring device, comprising: a base frame; a rear leg assembly; a front leg assembly; a hip joint; and a piston; wherein the piston may be connected to the base frame and the rear leg assembly; wherein a lower portion of the rear leg assembly may be connected to the base frame and an upper portion of the rear leg assembly may be connected to an upper portion of the front leg assembly at the hip joint;

wherein the front leg assembly comprises an articulating ankle and a replica foot; wherein the replica foot may be configured to don a shoe; and wherein when the piston actuates forward, the upper portion of the rear leg assembly may tilt forward, which may cause the front leg assembly to move forward and downward, simulating a step of a human, which causes the shoe on the replica foot to contact a force plate or a surface that may be on top of the force plate. The traction of an outer sole of the shoe may be measured when the shoe contacts the force plate or the surface that may be on top of the force plate. The device may further comprise a foot rest; wherein the foot rest may position the front leg assembly above the force plate. The foot rest may comprise a wheel; wherein the wheel may be configured to position the front leg assembly above the force plate. The foot rest may be connected to the base frame. The articulating ankle may be adjustable, such that the replica foot may have at least two positions: a toe side forward position and an outer side forward position. The articulating ankle may be adjustable by removing the articulating ankle from the front leg assembly, turning the articulating ankle, and reconnecting the articulating ankle to the front leg assembly. The articulating ankle may be configured to hinge on one or more planes. The articulating ankle may be configured to hinge on two planes, which may allow the articulating ankle to simulate one or more movements of a human ankle. The device may further comprise a controller; wherein the controller may be in communication with and control a plurality of movements of the piston. The piston may be a pneumatic piston or an electric actuator. The device may further comprise one or more weights; and a hip joint axle; wherein the hip joint axle may be configured to rotatably connect to the upper portion of the rear leg assembly and to the upper portion of the front leg assembly; and wherein the one or more weights engage with the hip joint axle, such that when the replica foot contacts a force plate or a surface that may be on top of the force plate, the one or more weights simulates a weight of the human during the step.

Another embodiment of the traction testing device and system of the present disclosure may be a shoe traction testing and measuring device, comprising: a rear leg assembly; a front leg assembly; a hip joint; and a piston; wherein the piston may be connected to a base frame and the rear leg assembly; wherein a lower portion of the rear leg assembly may be connected to the base frame and an upper portion of the rear leg assembly may be connected to an upper portion of the front leg assembly at the hip joint; wherein the front leg assembly may comprise an articulating ankle and a replica foot; wherein the replica foot may be configured to don a shoe; and wherein when the piston actuates forward, the upper portion of the rear leg assembly may tilt forward, which may cause the front leg assembly to move forward and downward, simulating a step of a human, which may cause the shoe on the replica foot to contact a force plate or a surface that may be on top of the force plate; wherein a traction of an outer sole of the shoe may be measured when the shoe contacts the force plate or the surface that may be on top of the force plate. The device may further comprise a foot rest; wherein the foot rest positions the front leg assembly above the force plate; wherein the foot rest may be connected to the base frame. The articulating ankle may be adjustable, such that the replica foot may have at least two positions: a toe side forward position and an outer side forward position; wherein the articulating ankle may be configured to hinge on two planes, which allows the articulating ankle to simulate one or more movements of a human ankle. The device may further comprise a controller; wherein the controller may be in communication with and controls a plurality of movements of the piston. In various embodiments the piston may be a pneumatic piston. The device may further comprise: one or more weights; and a hip joint axle; wherein the hip joint axle may be configured to rotatably connect to the upper portion of the rear leg assembly and to the upper portion of the front leg assembly; wherein the one or more weights engage with the hip joint axle, such that when the replica foot contacts a force plate or a surface that may be on top of the force plate, the one or more weights simulates a weight of the human during the step.

Another embodiment of the traction testing device and system of the present disclosure may be a shoe traction testing and measuring device, comprising: a base frame; a rear leg assembly; a front leg assembly; a hip joint, wherein the hip joint may comprise a hip joint axle; a foot rest, wherein the foot rest may be connected to the base frame and comprises a wheel; a piston; one or more weights; and a controller, wherein the controller may be in communication with and control a plurality of movements of the piston; wherein the piston may be connected to the base frame and the rear leg assembly; wherein a lower portion of the rear leg assembly may be connected to the base frame and an upper portion of the rear leg assembly may be connected to an upper portion of the front leg assembly at the hip joint via the hip joint axle; wherein the front leg assembly comprises an articulating ankle and a replica foot; wherein the replica foot may be configured to don a shoe; wherein when the piston actuates forward, the upper portion of the rear leg assembly may tilt forward, which may cause the front leg assembly to move forward and downward, simulating a step of a human, which may cause the shoe on the replica foot to contact a force plate or a surface that may be on top of the force plate; wherein a traction of an outer sole of the shoe may be measured when the shoe contacts the force plate or the surface that may be on top of the force plate; wherein the wheel may be configured to position the front leg assembly above the force plate; wherein the foot rest may be connected to the base frame; wherein the articulating ankle may be adjustable, such that the replica foot may have at least two positions: a toe side forward position and an outer side forward position; wherein the articulating ankle may be configured to hinge on two planes, which allows the articulating ankle to simulate one or more movements of a human ankle; wherein the one or more weights engage with the hip joint axle, such that when the replica foot contacts a force plate or a surface that may be on top of the force plate, the one or more weights simulates a weight of the human during the step; wherein weight of the simulated human may be in the range of 130 to 180 pounds; wherein the rear leg assembly and the front leg assembly have an angle range of 10°-20°; wherein shoe traction testing and measuring device simulates a walking speed of 1.0 to 1.3 m/s; wherein shoe traction testing and measuring device may allow for a slipping motion; wherein shoe traction testing and measuring device may have an inverted pendulum walking motion; and wherein the articulating ankle may have an angle range on each of the two planes of 2°-30°.

The present disclosure may result in reduced costs to test the traction of a shoe.

In one embodiment, because of the adjustability of the testing device, it preferably may accurately re-create the heel contact and push off motions of normal human gait, as well as the side step motion common in sports like basketball and soccer.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF ILLUSTRATIVE EMBODIMENTS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not expected to be part of substantially all the group of items.

As used herein, the terms "approximately" and "about" generally refer to a deviance of within 5% of the indicated number or range of numbers. In one embodiment, the term "approximately" and "about", may refer to a deviance of between 0.0001-10% from the indicated number or range of numbers.

Figure 1:
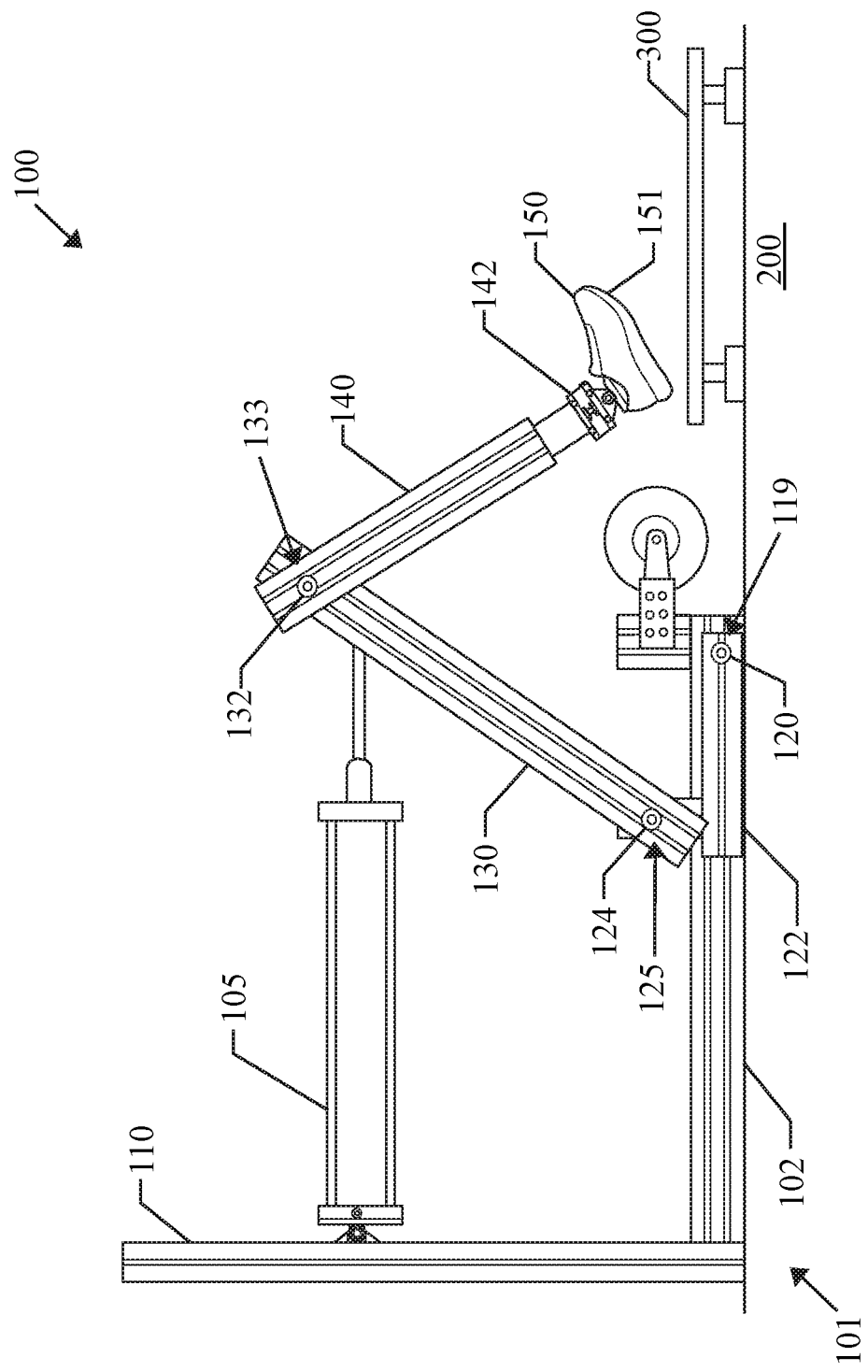
FIG. 1 is an illustration of a perspective view of one embodiment of the shoe traction testing device.

FIG. 1 is a side view of the traction measuring and testing device. As shown in FIG. 1, the traction measuring and testing device 100 may replicate the motion of walking and running in order to assess the traction of a shoe. FIG. 1 shows that the device 100 may comprise a base 101, force plate 300, front leg bar 140, rear leg bar 130, and piston 105. As shown in FIG. 1, the traction measuring and testing device 100 may have a L-shaped base 101, with a vertical portion 110 and a horizontal portion 102. The base 101 may be configured to be any shape, may be unitary, or may be made from several different portions. Preferably the base 101 provide steady and substantially unmoving support for the moving portions of the device 100. The base may be permanently or removeably connected to the ground 200. The device 100 may comprise a piston 105 that may be attached to the vertical portion 110 of the base 101. The horizontal portion 102 of the base 101, as shown, may be substantially parallel to the ground and is preferably securely fastened to the ground 200.

FIG. 1 shows that the device 100 may further comprise a base bar 122. The base bar 122 may be axially connected to the horizontal portion 102 of the base 101 via axle 119. The axle 119 may attach to a front portion (or toe end) of base bar 122 at connection point 120 and a back portion (or heel end) of base bar 122 may attach to a bottom portion the rear leg bar 130 via axle 125 at connection point 124. In this manner base bar 122 may act like the rear foot of a walking person and the rear leg bar 130 may act like the rear leg of a walking person. The base bar 122 and rear leg bar 130 move similar to how a rear foot and leg move during the gait cycle.

Figure 2:
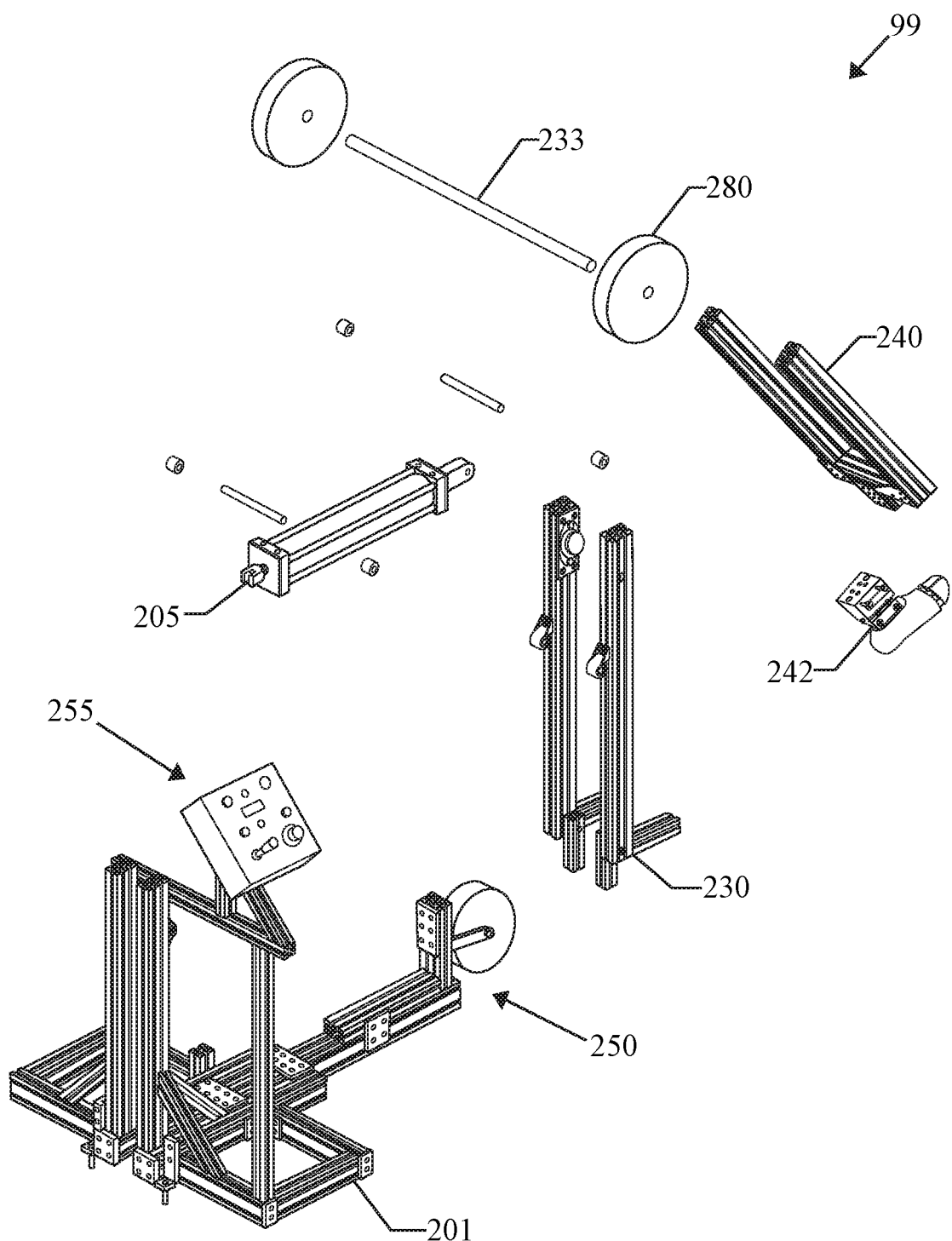
FIG. 2 is an illustration of an exploded view of another embodiment of the shoe traction testing device.
Figure 3:
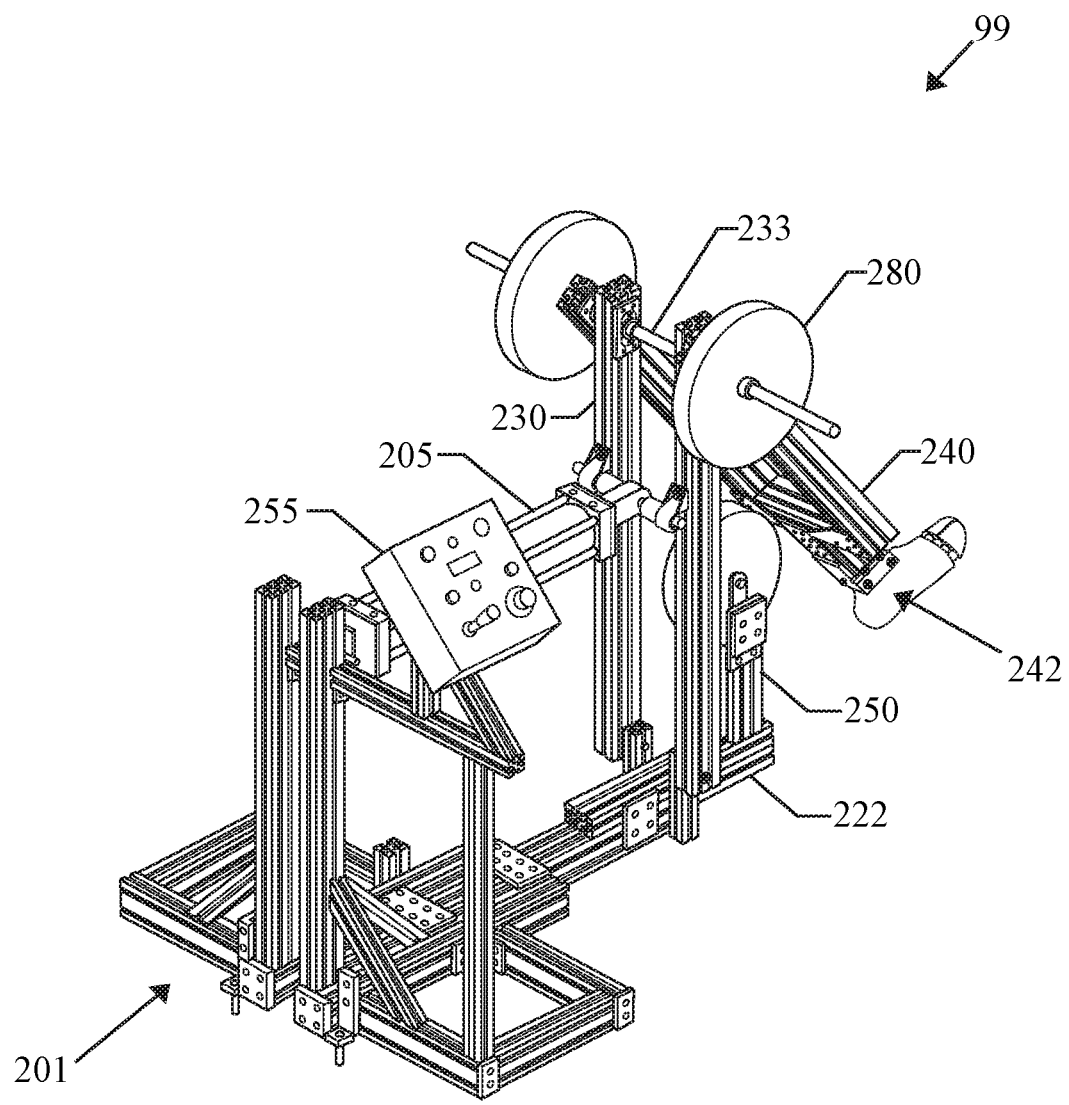
FIG. 3 is an illustration of a front perspective view of an embodiment of the shoe traction testing device.
Figure 4:
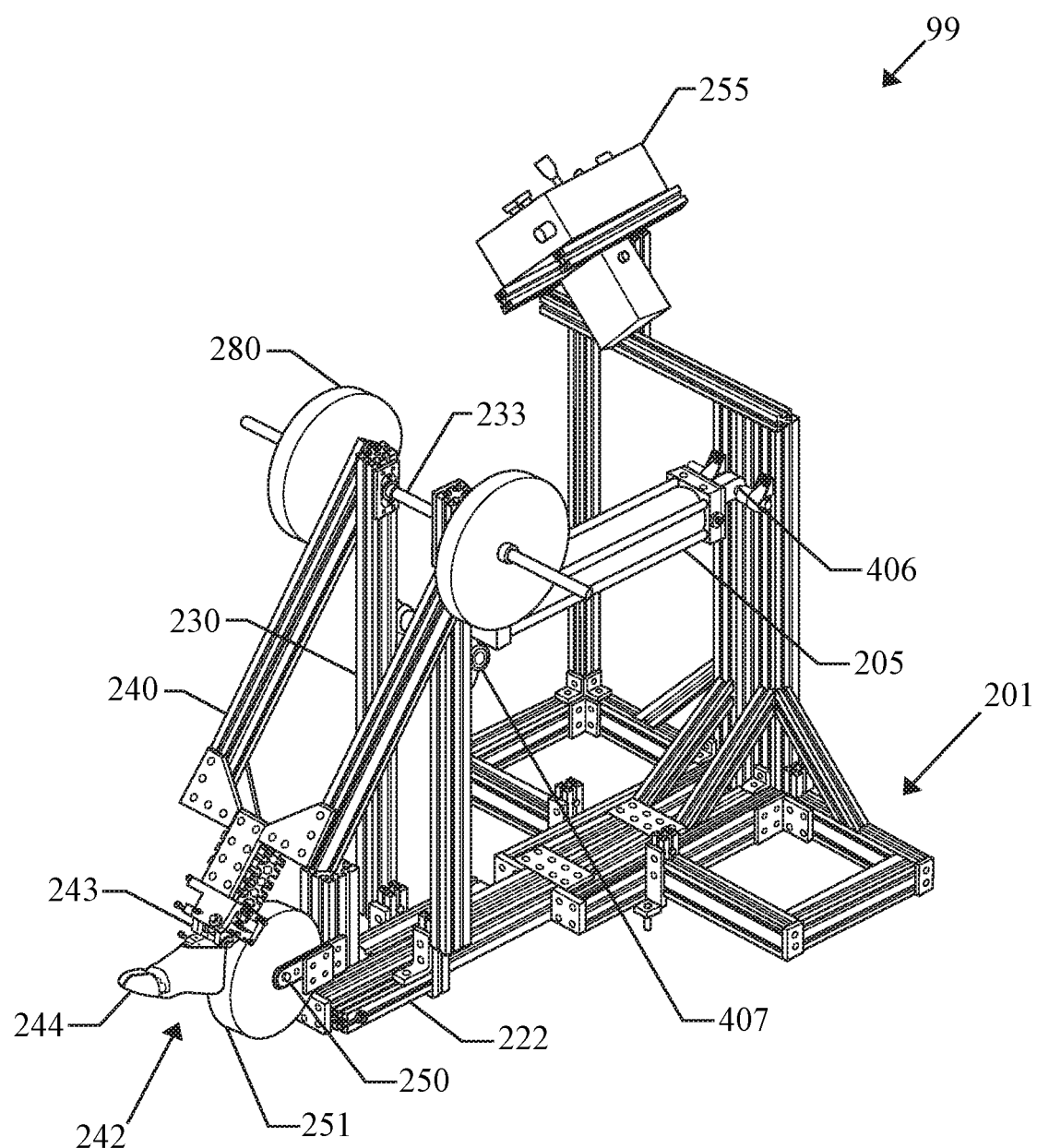
FIG. 4 is an illustration of a rear perspective view of an embodiment of the shoe traction testing device.

FIG. 1 shows that a top portion of rear leg bar 130 is moveably connected to front leg bar 140 via hip joint axle 133 at connection point 132. The piston 105 may be attached to the rear leg bar 130, such that when the piston 105 is extended the rear leg bar 130 is pushed forward. The hip joint axle 133 may extend outward (distally and/or proximately) so that the hip joint axle 133 may accept weighted plates. The hip joint axle 133 may be substantially similar to the hip joint axle 233, as shown in FIGS. 2-4. As shown in FIG. 1, the front leg bar 140 may project forward and downward from connection point 132. In one embodiment, the bottom portion of the front leg bar 140 may be an articulating ankle 142. The articulating ankle 142 may have two or more hinges that allow rotation and or articulation in two or more planes and may have a range of motion similar to that of a human ankle. A replica of a human foot 150 may be firmly attached to the ankle 142. The foot 150 may have a shoe 151 attached to it. Typically, the shoe 151 may have an outer sole that has a traction that may be measured.

In one embodiment, when the piston actuates the rear leg bar 130 forward, the front leg bar 140 may move the foot 150 and shoe 151 downward, such that the shoe 151 comes into contact with the force plate 300. The force plate 300 is preferably configured to measure and record the vertical and sheer forces. Preferably, the top of the force plate 300 may be a flooring surface that a human would commonly encounter (wood, concrete, tile, dirt, rock, mud, ice, etc.). The force plate 300 may measure and/or record the vertical and sheer forces to allow for measurement of Coefficient of Friction (=horizontal sheer force/vertical force) of the outer sole of the shoe. Preferably the Coefficient of Friction is measured at multiple time increments after the shoe 151 contacts the surface flooring that covers the force plate 300. Preferably, the device may be used by shoe makers and others in the footwear industry to quantify the traction of the outer soles of shoes on different surfaces and with different surface contaminants.

FIG. 2 is an illustration of an exploded view of another embodiment of the shoe traction testing device. As shown in FIG. 2, the shoe traction testing and measuring device 99 may comprise a base frame 201, front leg rest 250, rear leg assembly 230, piston 205, hip joint axle 233, weights 280, front leg assembly 240, foot and ankle assembly 242, and controller 255. In one embodiment, the base frame 201 is part of the shoe traction testing device 99. In another embodiment, the base frame 201 is a frame that the device 99 is connected to that rigidly supports moveable portions of the device 99.

FIG. 3 is an illustration of a front perspective view of an embodiment of the shoe traction testing device. As shown in FIG. 3, the shoe traction testing and measuring device 99 may comprise a base frame 201, front leg rest 250, rear leg assembly 230, foot portion 222, piston 205, hip joint axle 233, weights 280, front leg assembly 240, foot and ankle assembly 242, and controller 255. FIG. 3 shows that the base frame 201 may be rigid structure that supports the moving parts of the device 99. Preferably the frame 201 may be made from aluminum or some other very strong metal, but it may be made of any material, including wood, plastic or composite. The frame 201 may be permanently or removeably affixed to the ground, floor, or surface, so that it is unmoving relative to the ground when in testing mode. FIG. 3 shows that the piston may be connected to the frame 201 and rear leg assembly 230, such that the piston 205 may push the rear leg assembly 230 forward and retract it backward as programmed and/or controlled by the controller 255.

In some embodiments the piston may be pneumatic. In other embodiments the piston may be an electric actuator. The piston may be any mechanism that may linearly push and pull the rear leg assembly 230 relative to the frame 201.

FIG. 3 shows that the base frame 201 may be made from several interconnected bars or pieces and may have a horizontal base and a vertical back. However, the base frame may be a unitary piece or made from any number of bars or pieces. In one embodiment the base frame may be a floor and wall corner.

The controller 255 may be a digital, analog, or combination of the two. The controller 255 preferably controls the speed of movement of the piston 205. The controller 255, as shown may be attached to the frame 201 and may be in electrical communication with the piston 205 and/or a force plate or sensor pad. In other embodiments the controller may be a remote electronic data processing unit or computer that is in wireless communication with the piston or actuator. The device 99 may have manual, analog, or digital emergency shutoff and other safety controls.

FIG. 4 is an illustration of a rear perspective view of an embodiment of the shoe traction testing device. As shown in FIG. 4, the shoe traction testing and measuring device 99 may comprise a base frame 201, front leg rest 250, rear leg assembly 230, piston 205, hip joint axle 233, weights 280, front leg assembly 240, foot and ankle assembly 242, and controller 255. FIG. 4 shows that the piston 205 may connect to the frame 201 at joint 406 and may connect to the rear leg assembly 230 at joint 407. The foot and ankle assembly 242 may comprise an articulating ankle 243 and replica foot 244. The foot rest 250 may comprise a wheel 251.

Figure 5:
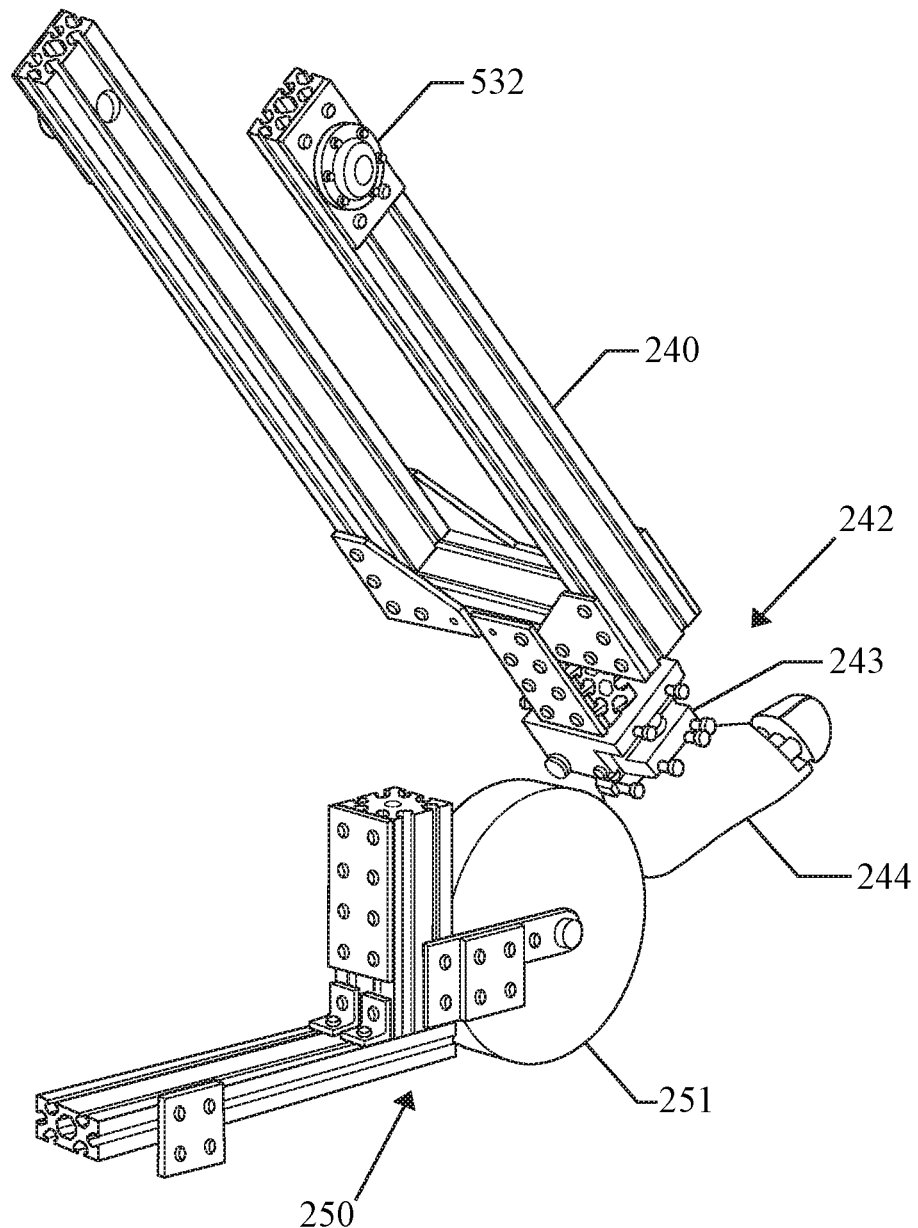
FIG. 5 is an illustration of a perspective view of one embodiment of the front leg and front leg rest.

FIG. 5 is an illustration of a perspective view of one embodiment of the front leg and front leg rest. FIG. 5 shows that the wheel 251 may support the foot and ankle assembly 242 when the device 99 is not in test mode and allows the foot and ankle assembly 242 to slide past the foot rest 250 with substantially no friction when in test mode. FIG. 5 shows that the foot rest 250 may be adjustable, such allows the user to position the front leg assembly 240 at a wide range of angles and positions. FIG. 5 also shows that the front leg assembly 240 may have hip joint connection point (or hole) 532, which may engage with hip joint axle 233.

Figure 6:
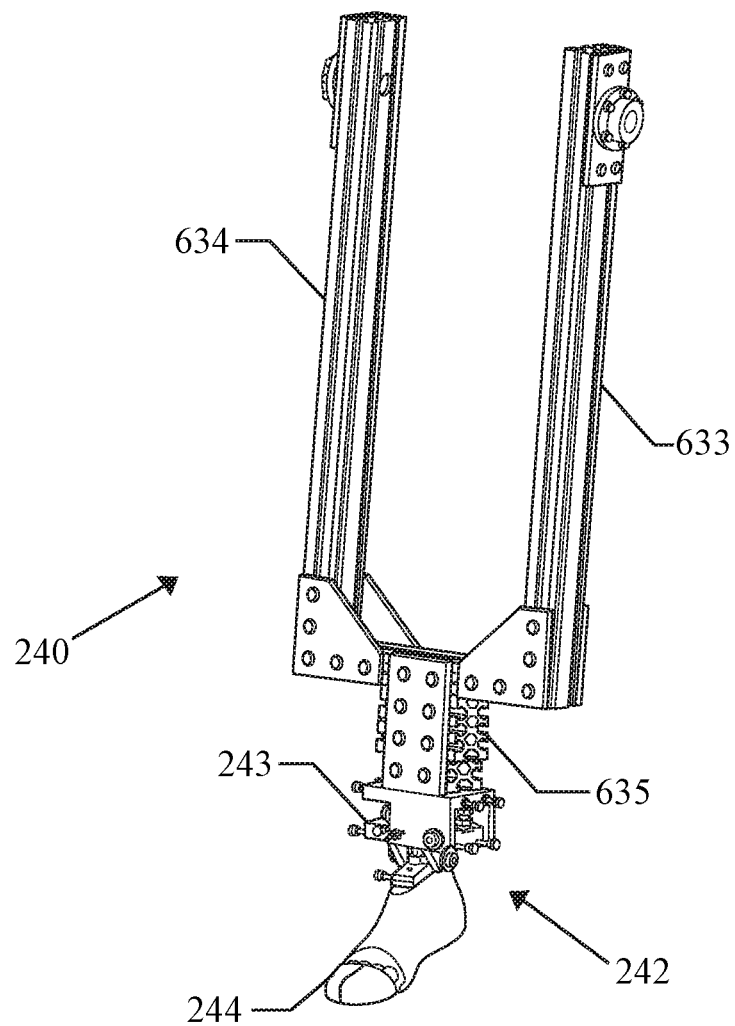
FIG. 6 is an illustration of a perspective view of one embodiment of the front leg.

FIG. 6 is an illustration of a perspective view of one embodiment of the front leg. As shown in FIG. 6, the front leg assembly 240 may have two main bars 634, 635 and ankle connection portion 635. Ankle connection portion 635 may be removeably (or permanently) connected to articulating ankle 243, which may be removeably (or permanently) connected to the replica foot 244. FIG. 6 shows that the replica foot 244 may be in a forward position relative to front leg 240. Preferably, the foot and ankle assembly 242 may be removed from the leg assembly 240, rotated 90 degrees (in either direction) or 180 degrees, and then reattached to the leg assembly 240. This may allow the device 99 to measure the traction of a shoe sole from several different positions. In some embodiments there may be one or more main bars 634, 635. The main bars 634, 635, when resting or in use, may be substantially vertical or tilt diagonally with the lower part of the main bars 634, 635 more forward than the top part. When the device 99 simulates a step, the main bars 634, 635 may be pushed downward so that a shoe on the replica foot 244 may come into contact with the sensor pad.

Figure 7:
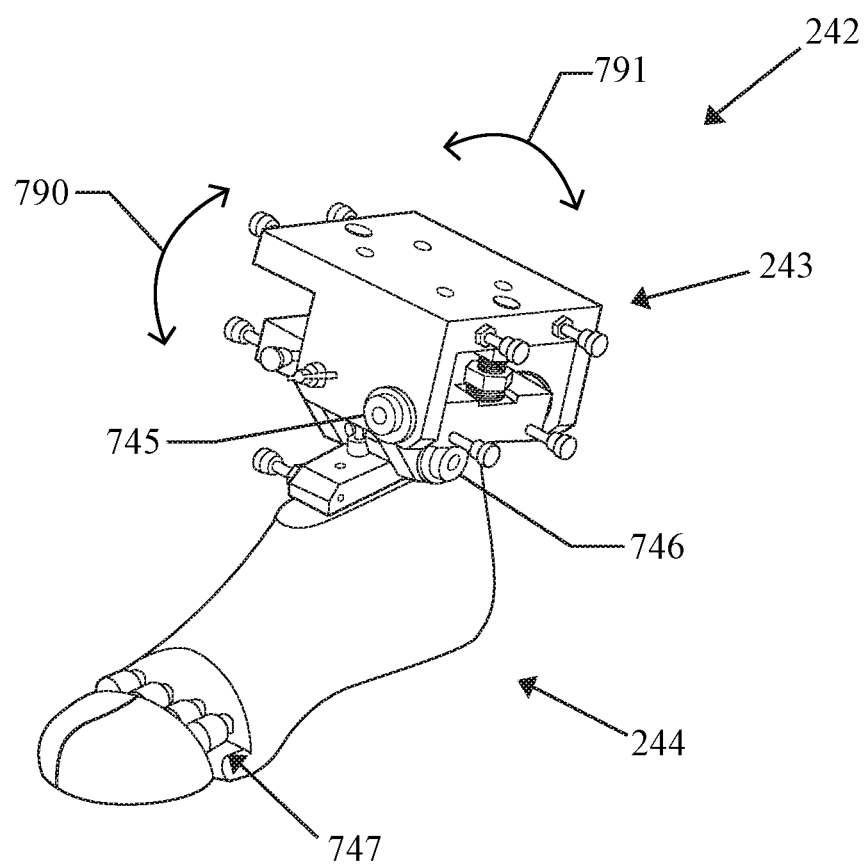
FIG. 7 an illustration of the front foot and ankle assembly.

FIG. 7 is an illustration of the front foot and ankle assembly. FIG. 7 shows that the foot and ankle assembly 242 may comprise an articulating ankle 243 and replica foot 244. The replica foot 244 may have an adjustable and/or hinged joint 747. The articulating ankle 243 may be hinge on two planes, side to side 791 and front to back 790. This may be done using hinges 745 and 746. The articulating ankle may allow the testing device 99 to have a high biofidelity because the ankle 243 may simulate a human ankle when the shoe on the replica foot comes into contact with the sensor pad. The hinges 745 and 746 may be tightened or loosened in order to be able to better simulate the movements of an actual ankle during the testing of the shoe traction.

Figure 8:
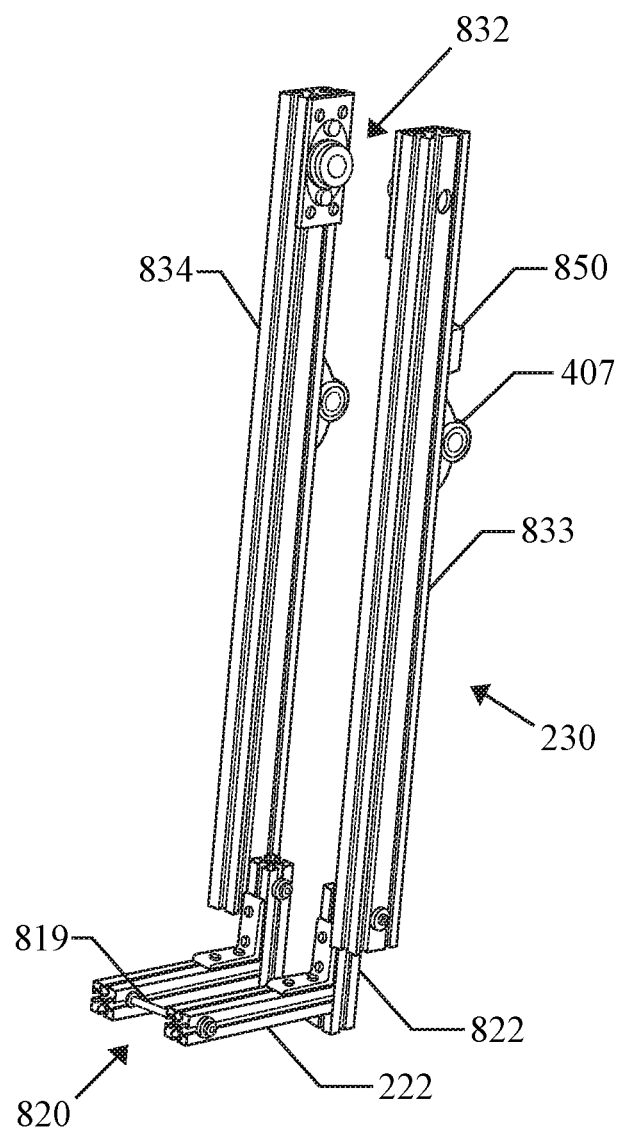
FIG. 8 is an illustration of one embodiment of the rear leg.
Figure 9:
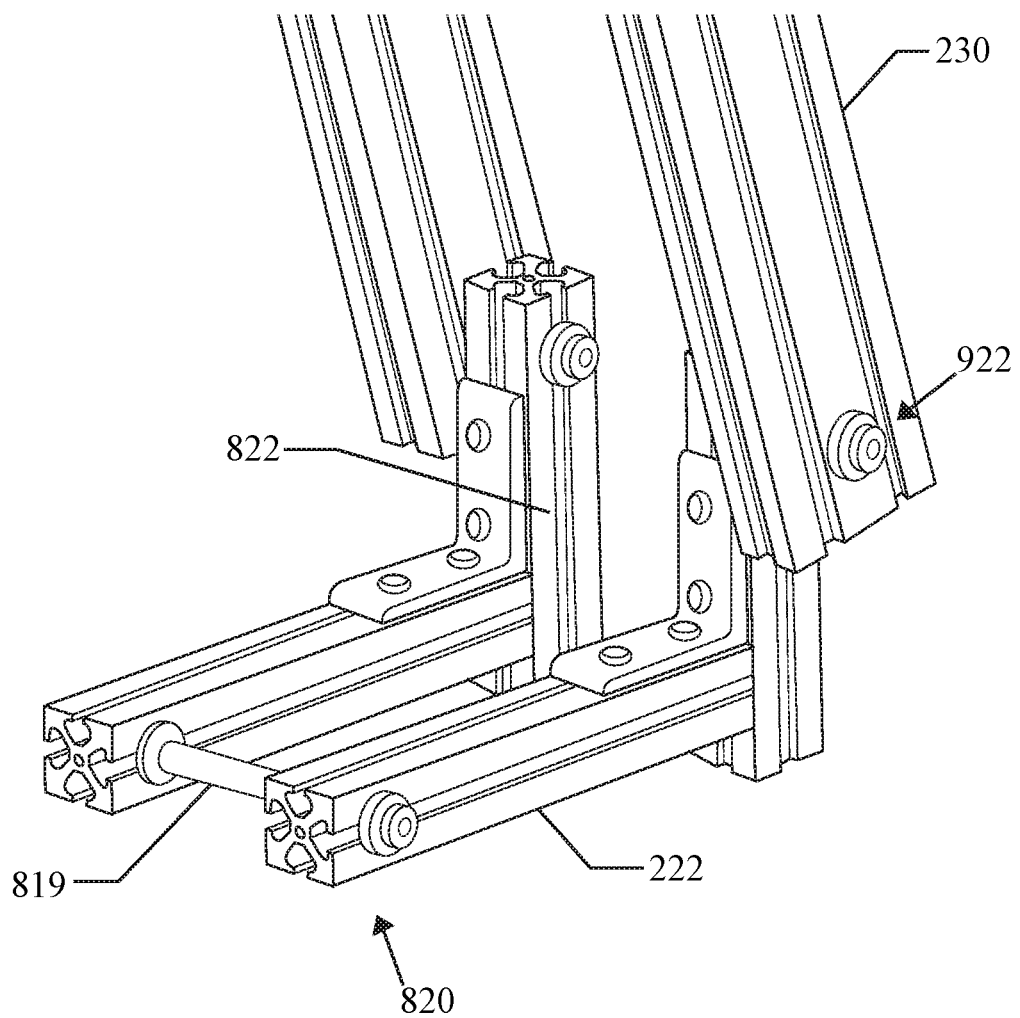
FIG. 9 is an illustration of one embodiment of the rear ankle and foot portion.

FIG. 8 is an illustration of one embodiment of the rear leg. FIG. 8 shows that rear leg assembly 230 may comprise main bars 833, 834, rear foot portion 222, piston connection 407, hip joint connection point (or hole) 832, and sensor assembly 850. The rear foot portion 222, may comprise rear leg axle 819, rear leg connection portion 820, and ankle portion 822. The sensor assembly 850 may have an accelerometer or other mechanism that allows it to determine whether the rear leg is moved forward or backward and at what speed. In this manner the sensor data may be compared to the commands of the controller to make sure that the piston is moving the rear leg 230 at the correct velocity and/or acceleration. In some embodiments the sensor assembly 850 may be on the front leg. The rear leg 230 may attach to the base frame 201 via axle 819. The length of foot assembly 222 may be adjusted by using a longer foot bar. The angle of tilt of the rear leg 230 as the rear leg main bars 833, 834 is pushed/tilted forward by the piston 205, may be adjusted by how the ankles 822 attach to the main bars 833, 834. The ankles 822 may be connected at angle as shown in FIG. 9 or may be a parallel extension of the main bars 833, 834. The ankles 822 may also be of varying length to change the overall length of rear leg assembly 230. This adjustability allows a user to perform a shoe traction test that simulates a step being taken by a human and raises the biofidelity of the system.

FIG. 9 is an illustration of one embodiment of the rear ankle and foot portion. The rear ankle and foot portion may comprise foot bars 222, rear leg axle 819, rear leg connection portion (or hole) 820, ankle portions 822, and ankle/leg connection point 922. FIG. 9 shows that the rear ankle and foot portion may be made from several bars and connectors that are adjustable and removeable. The ankle/leg connection point 922 may allow for various angles between the leg 230 and the ankle 822. Axle 819 may connect the rear leg assembly 230 to the base frame 201, such that the rear leg assembly 230 may be, as preferred, freely rotatable at connection point 820 with respect to the frame 201.

Figure 10:
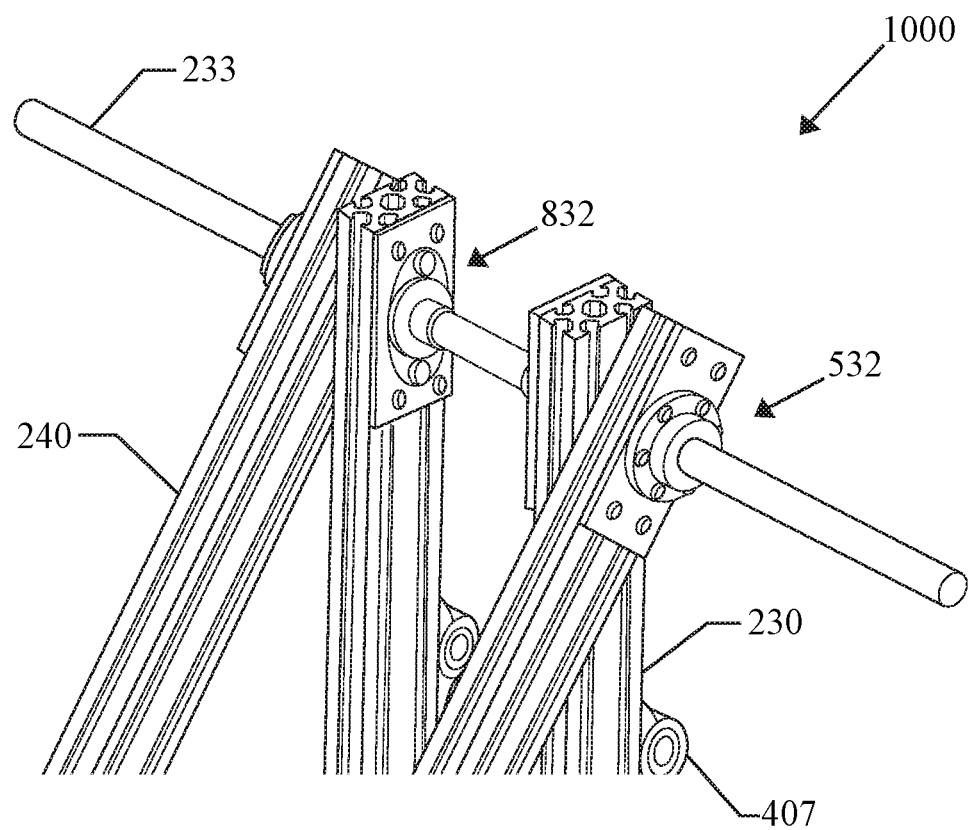
FIG. 10 is an illustration of one embodiment of a hip joint portion.

FIG. 10 is an illustration of one embodiment of a hip joint portion. The hip joint portion 1000 shown in FIG. 10 is one embodiment of how the rear leg assembly 230 is rotatably connected to the front leg assembly 240. The connection point 832 of rear leg assembly 230, the hip joint axle 832, and the connection point 532 of front leg assembly 240 may all form the hip joint portion 1000. When the piston 205, which may be connected to the rear leg assembly 230 at connector 407, moves the rear leg assembly 230, the front leg assembly, which may freely rotate at hip joint axle 233, may be pushed forward and downward.

Figure 11:
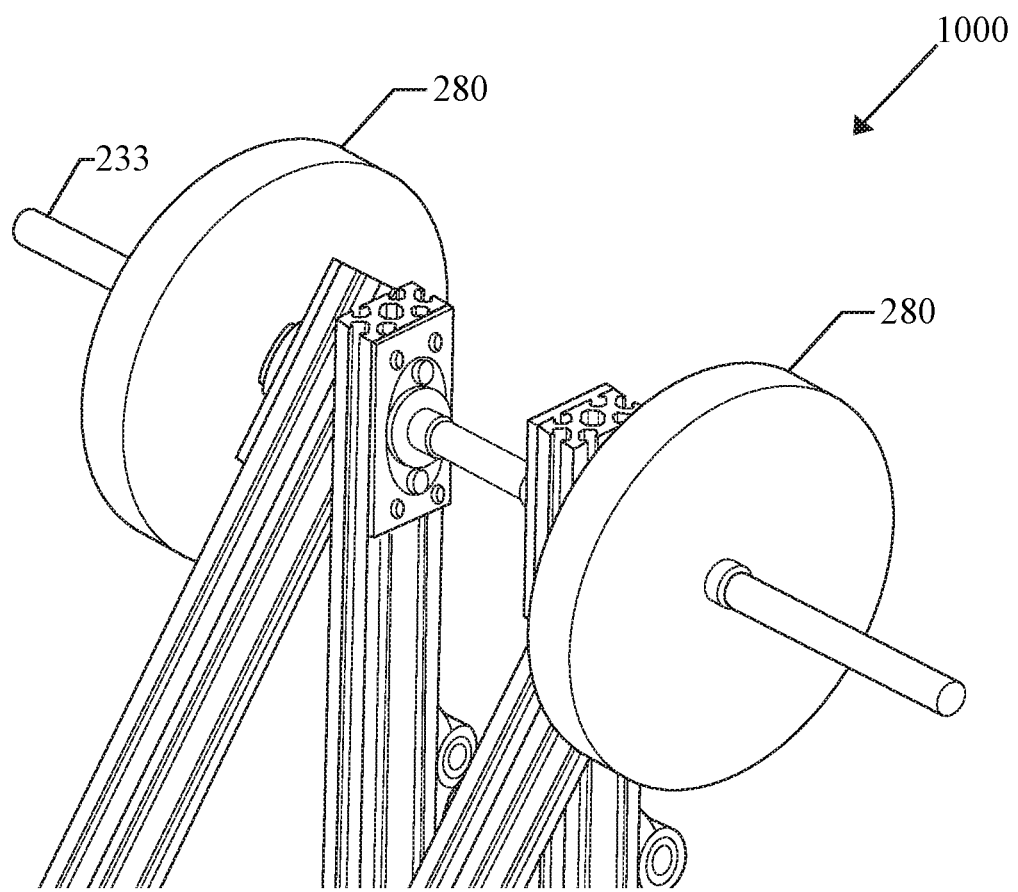
FIG. 11 is an illustration of one embodiment of a hip joint portion with weights.

FIG. 11 is an illustration of one embodiment of a hip joint portion with weights. FIG. 11 shows that the hip joint axle 233 of hip joint portion 1000 may be configured to accept weights 280. Depending on the weight and angle of the front leg assembly 240, about 20 pounds of weight on hip joint axle 233 may simulate a human that weighs approximately 170 pounds. Adding or taking off weights 280 allows the device 99 to simulate the traction measurements on humans of various weights and slip forces.

Figure 12A:
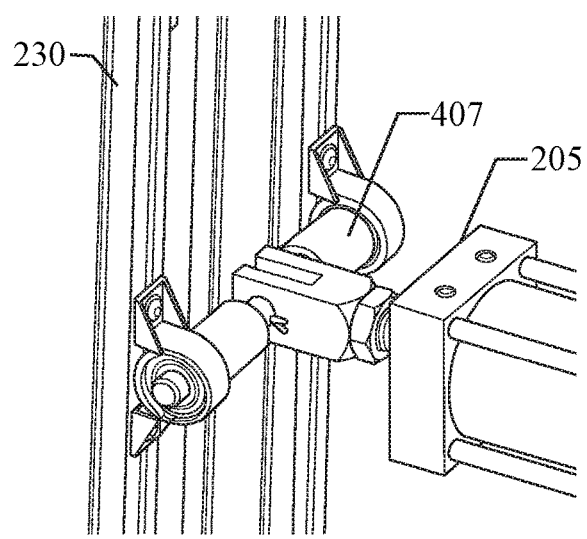
FIGS. 12a and 12b are illustrations of the piston-rear leg connection and the prison-frame connection.
Figure 12B:
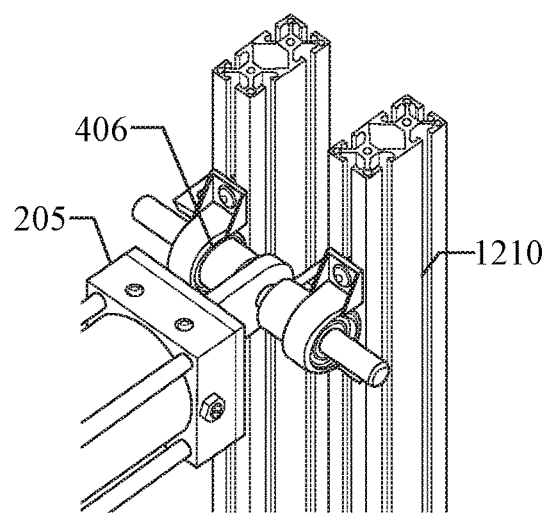

FIGS. 12a and 12b are illustrations of the piston-rear leg connection and the prison-frame connection. FIG. 12a shows that connection 407 may be an axle hinge connection that allows rear leg 230 to rotate freely with respect to piston 205 when piston 205 actuates forward or backward. FIG. 12b shows that connection 406 may be an axle hinge connection that allows piston 205 to rotate freely with respect to frame 201 when the piston 205 actuates.

Figure 13:
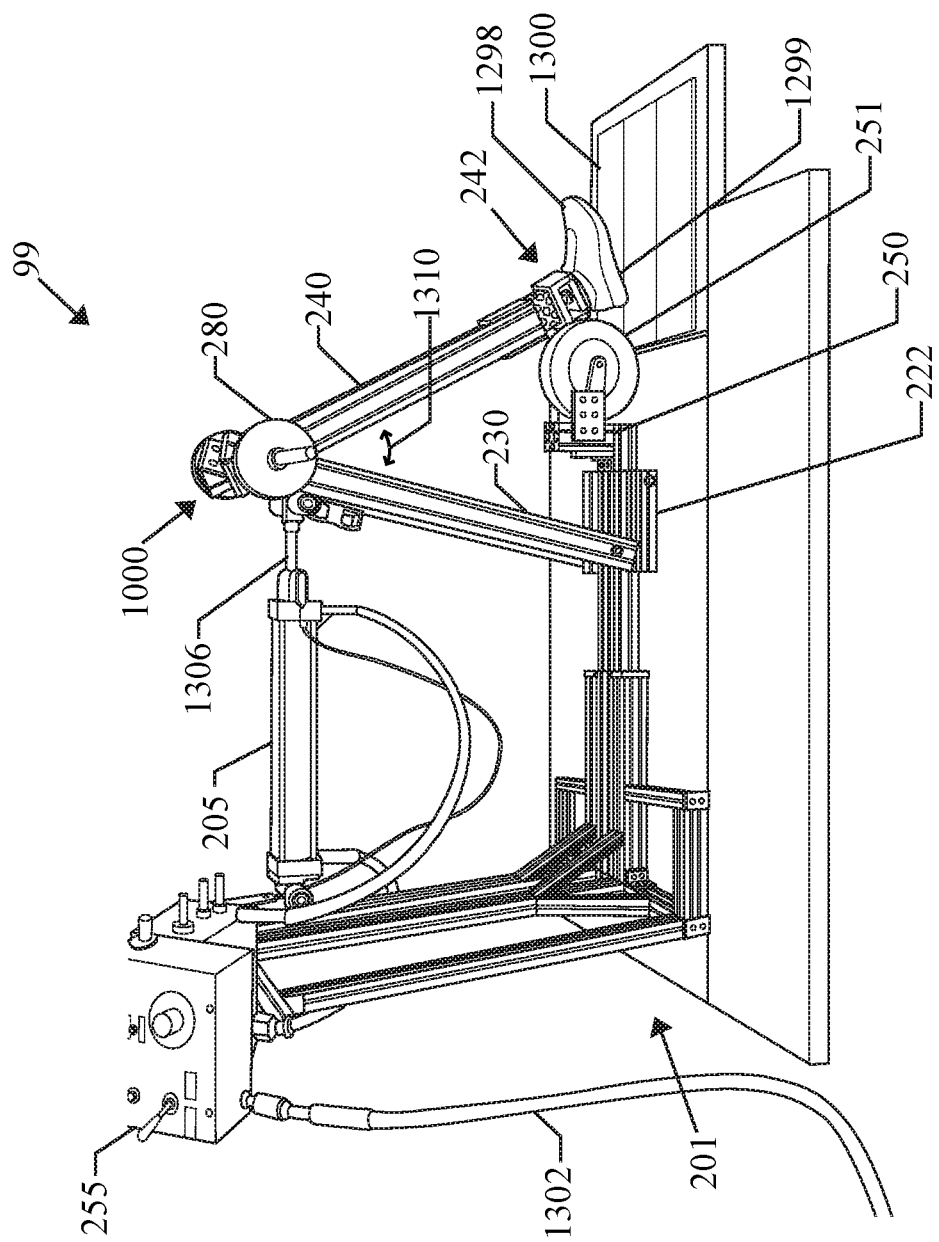
FIG. 13 is an illustration of a front perspective view of another embodiment of the shoe traction testing device.

FIG. 13 is an illustration of a front perspective view of another embodiment of the shoe traction testing device. As shown in FIG. 13, one embodiment of shoe traction testing device 99 may comprise controller 255, piston 205, piston rod 1306, frame 201, rear foot 222, foot rest 250, wheel 251, rear leg assembly 230, front leg assembly 240, hip joint 1000, weights 280, front foot and ankle assembly 242, and pneumatic air supply 1302. FIG. 13 shows how a shoe 1298, with outer sole 1299 has been donned by the replica foot. FIG. 13 also shows that the shoe 1298 has been positioned above a force plate 1300, such that when the front leg assembly 240 is moved forward and downward, the outer sole 1299 will contact the force plate 1300 and or any surface that is on the force plate 1300. FIG. 13 shows that the shoe 1298 is above a rearmost portion of the force plate 1300 such that the shoe may either stick or slide/slip forward on the force plate as a human step is simulated.

FIG. 13 shows that the angle 1310 may be adjusted by the following: changing the position of foot rest 250; adjusting the length of the legs 230 and/or 240; adjusting the starting position of rod 1306 within piston 205; adjusting the length or positioning of piston 205; adjusting the ankle angle of rear leg assembly 230. The device 99 may be adjusted so that when the shoe 1298 comes into contact with the force plate, it simulates a human stepping and potentially slipping.

Figure 14:
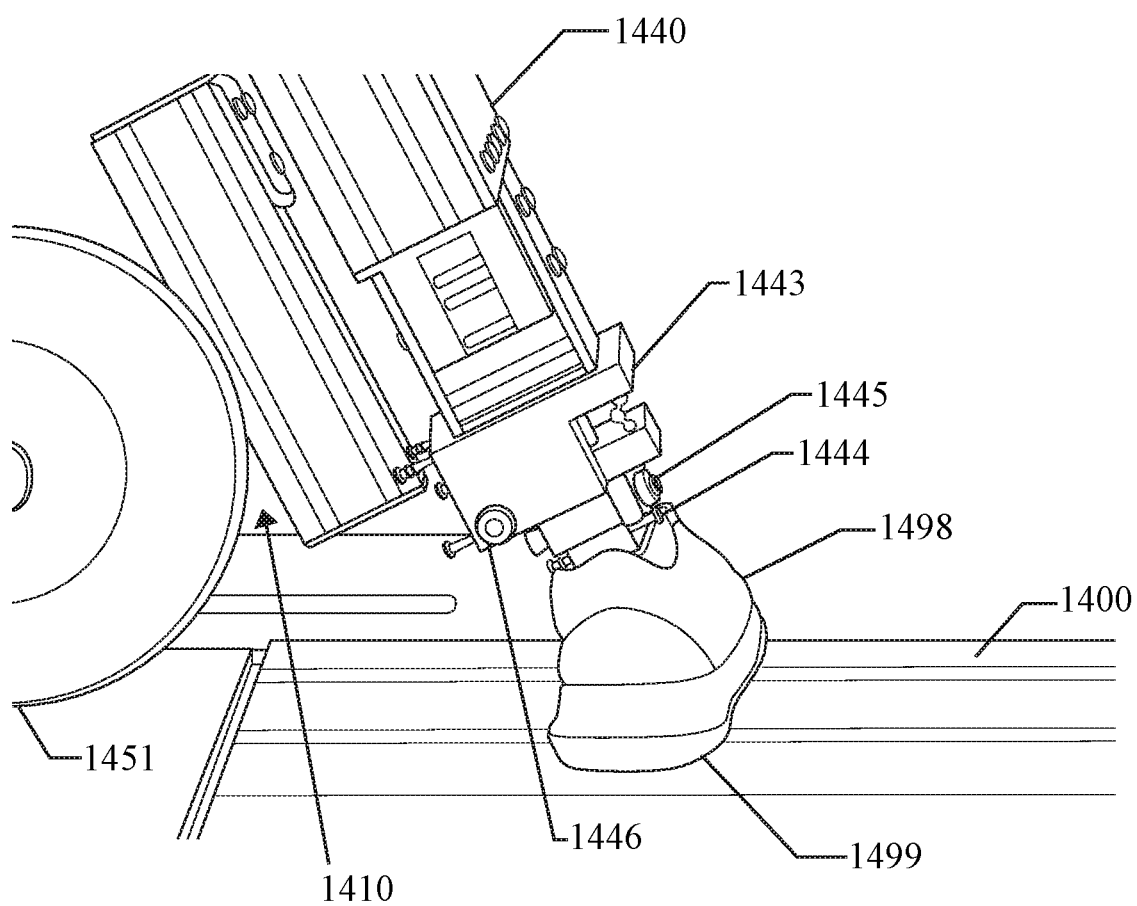
FIG. 14 is an illustration of a side view of one embodiment of the shoe traction testing device showing a first traction test in progress.

FIG. 14 is an illustration of a side view of one embodiment of the shoe traction testing device showing a first traction test in progress. FIG. 14 shows that a shoe 1498 with an outer sole 1499, may be donned by a replica foot 1444. The replica foot 1444 may be connected to an articulating ankle 1443, which may have hinges 1445 and 1446, which may allow the ankle to articulate on two planes, which may increase the biofidelity of the traction measuring device. The biofidelity of the device may be increased because when the shoe 1498 contacts the force plate 1400, the ankle may hinge up and down and/or side to side, which may simulate how a human ankle may react.

FIG. 14 shows that the piston has just moved the front leg assembly 1440 downward, such that outer sole 1499 has just contacted force plate 1400. Front leg assembly 1440 has been guided downward by sliding past wheel 1451. As shown, there is little or no space (yet) between leg 1440 and wheel 1451. FIG. 14 also shows that the ankle 1443 and foot 1444 have been turned so that the outer side of shoe 1498 is in a forward position. This is simulating a slip on a side step. FIG. 14 shows that the ankle 1443 has hinged open at hinge 1445.

Figure 15:
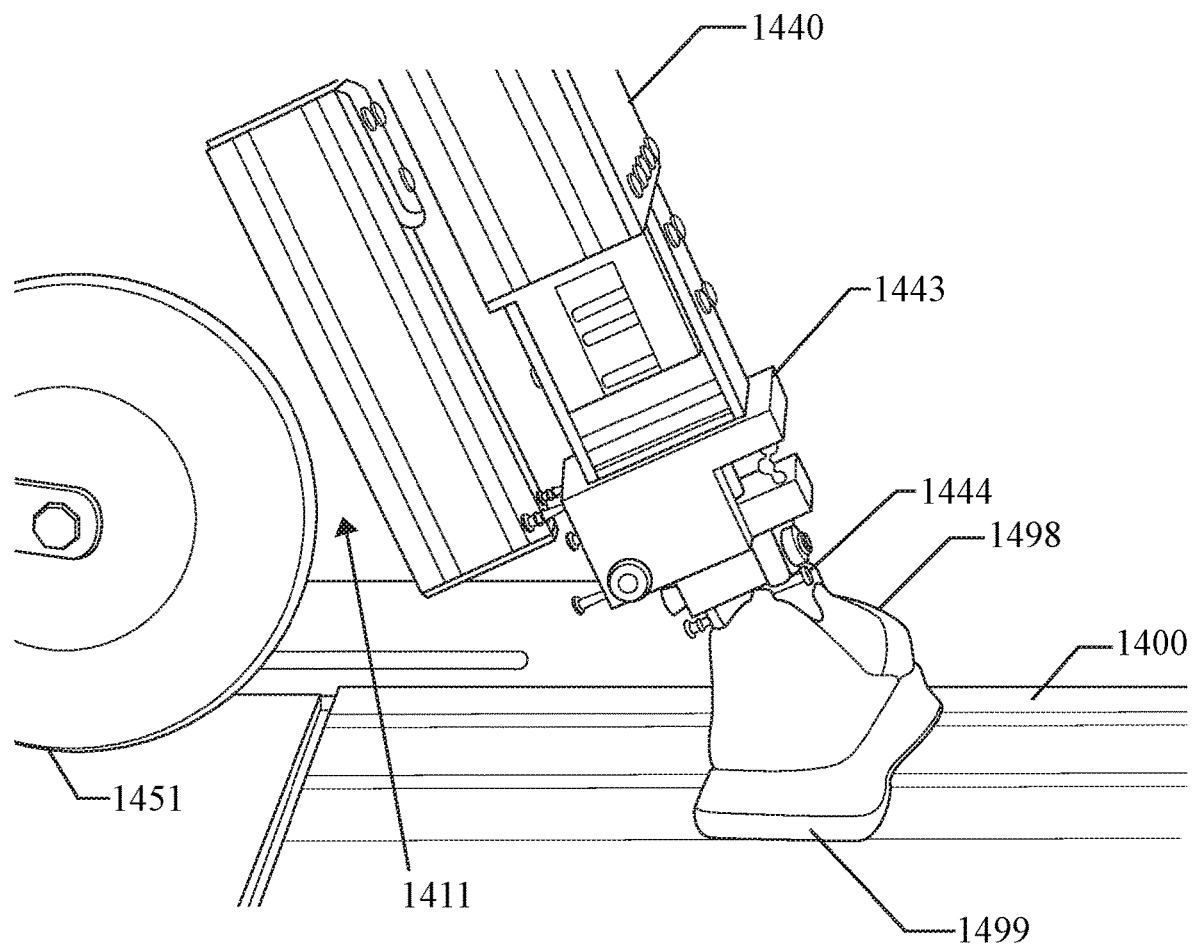
FIG. 15 is an illustration of a side view of one embodiment of the shoe traction testing device showing the first traction test in progress.

FIG. 15 is an illustration of a side view of one embodiment of the shoe traction testing device showing the first traction test in progress. FIG. 15 shows that the front leg assembly has slightly slipped on force plate 1400, such that the leg 1440 and shoe 1498 have moved forward on force plate 1400 and then stopped movement as the traction of the sole 1499 was measured and did not fail. Space 1411 shows how far the shoe 1498 slipped on the force plate 1400.

Figure 16:
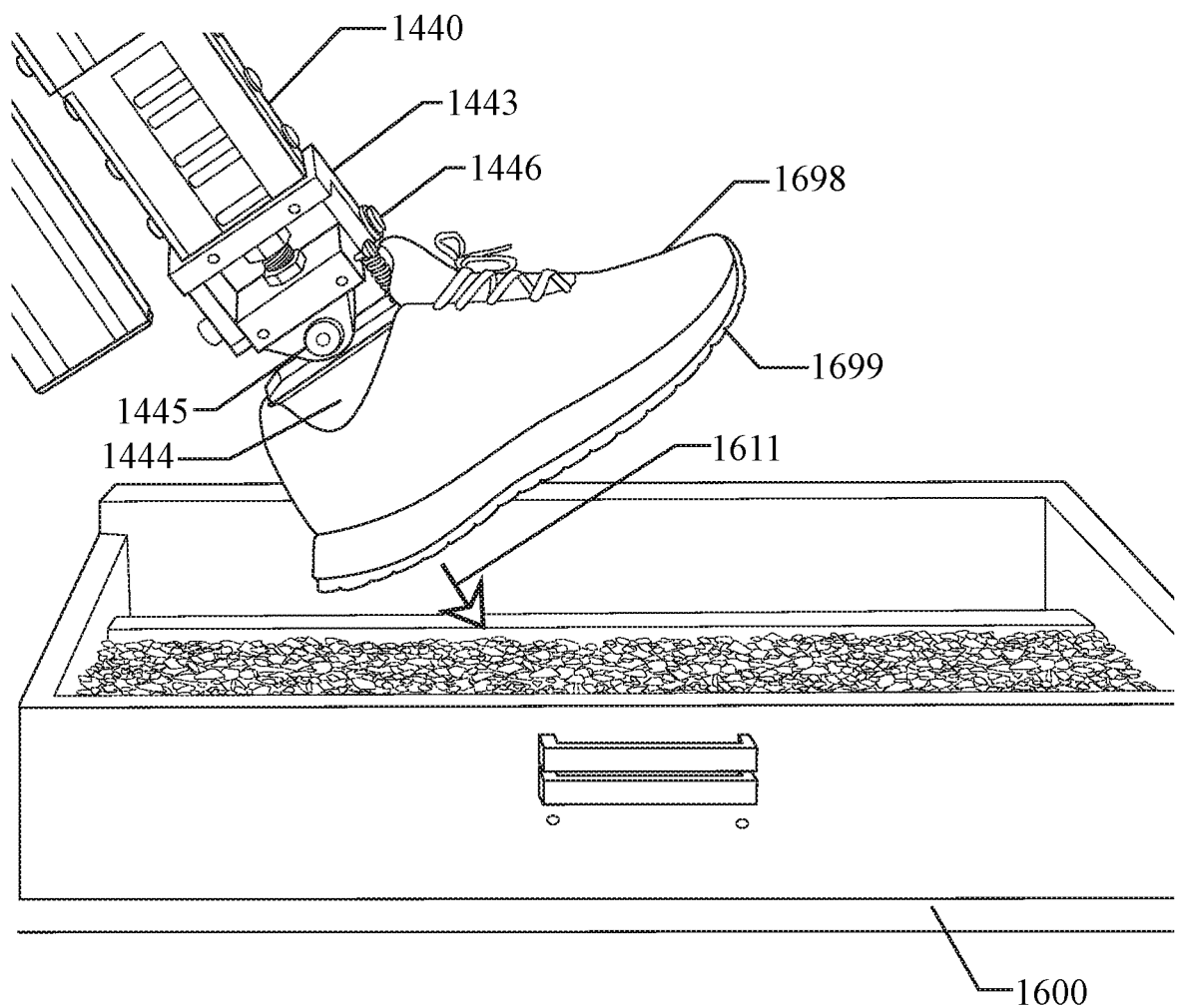
FIG. 16 is an illustration of a side view of one embodiment of the shoe traction testing device showing a traction test in progress.

FIG. 16 is an illustration of a side view of one embodiment of the shoe traction testing device showing a second traction test in progress. FIG. 16 shows that a shoe 1698 with an outer sole 1699, may be donned by replica foot 1444. Replica foot 1444 may be connected to articulating ankle 1443, which has hinges 1445 and 1446, which allow the ankle to articulate on two planes, which increases the biofidelity of the traction measuring device. FIG. 16 shows that the piston is about to move the front leg assembly 1440 downward 1611, such that the outer sole 1699 may come into contact with surface 1602, which is on top of force plate 1600.

FIG. 16 also shows that the ankle 1443 and foot 1444 may have been turned so that the front of shoe 1698 is in a forward position. This is a test that may simulate a slip on a forward step. FIG. 16 shows that the ankle 1443 may be likely to hinge open at hinge 1445. FIG. 16 shows that the surface 1602 may be a gravel or loose debris surface.

Figure 17:
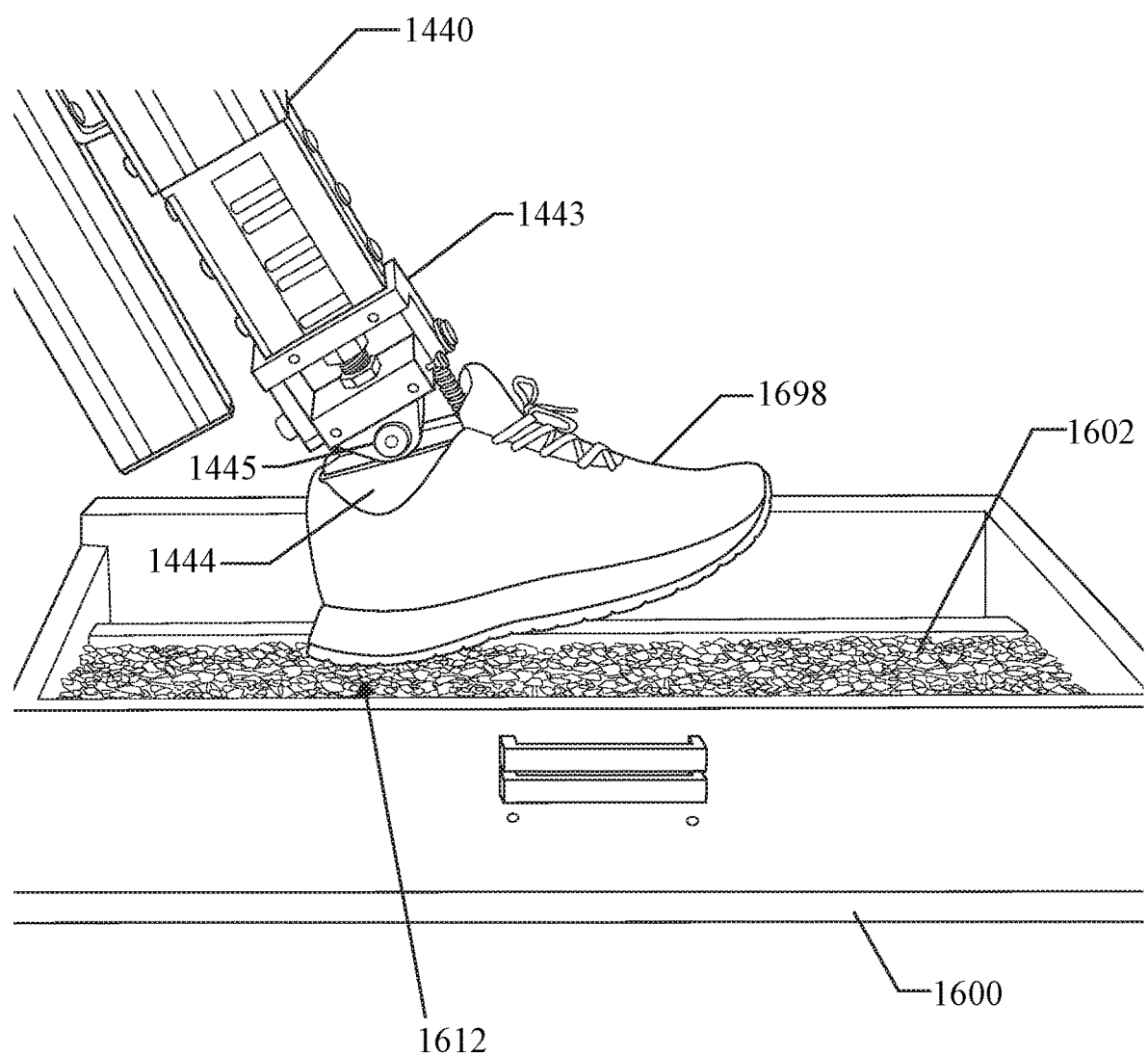
FIG. 17 is an illustration of a side view of one embodiment of the shoe traction testing device showing the second traction test in progress.

FIG. 17 is an illustration of a side view of one embodiment of the shoe traction testing device showing the second traction test in progress. FIG. 17 shows that the piston has just moved the front leg assembly 1440 downward, such that the outer sole 1699 has just contacted surface 1602 at point 1612. FIG. 17 shows that the ankle 1443 has started to hinge at hinge 1445, simulating a real human ankle.

Figure 18:
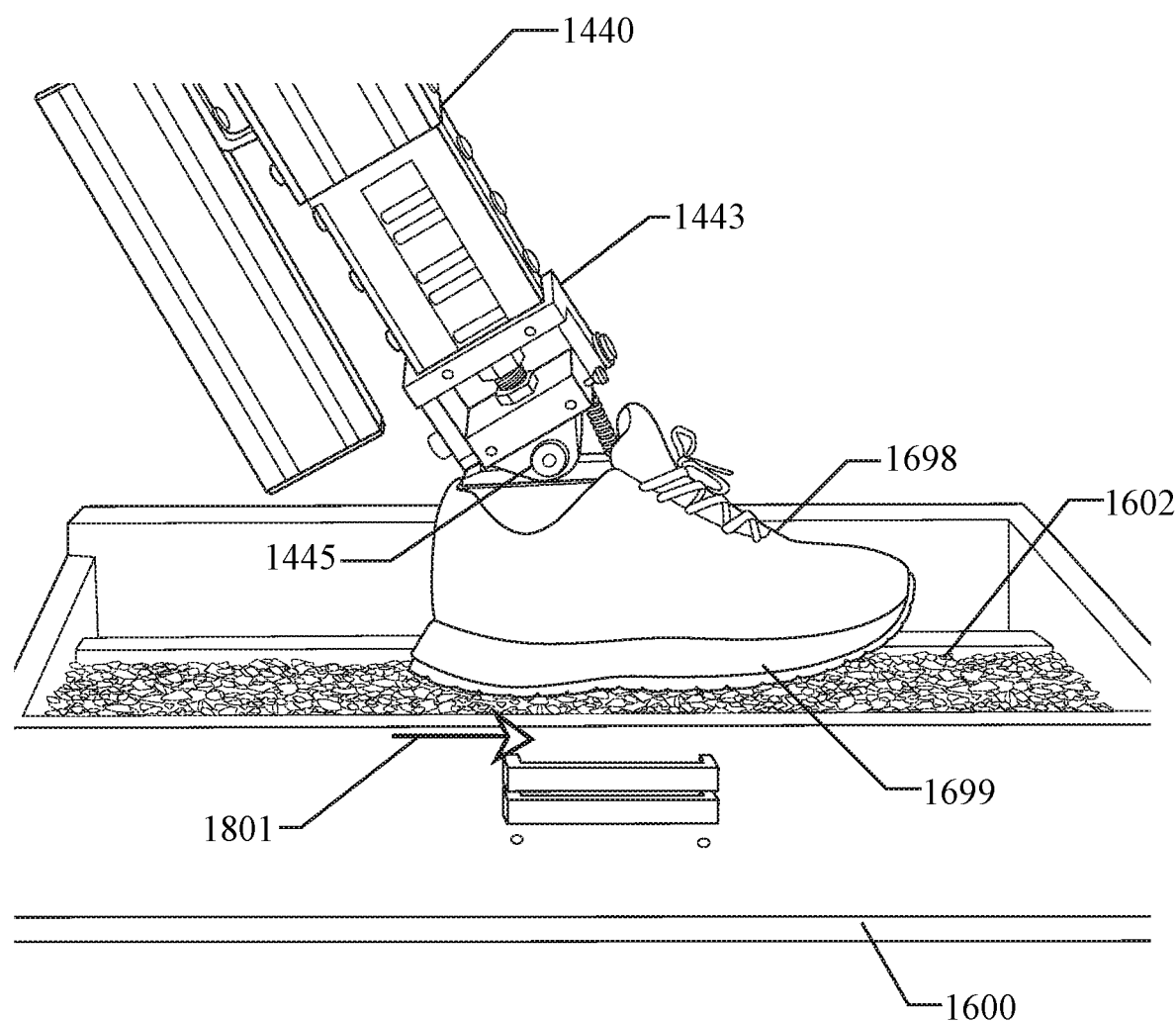
FIG. 18 is an illustration of a side view of one embodiment of the shoe traction testing device showing a traction test in progress.

FIG. 18 is an illustration of a side view of one embodiment of the shoe traction testing device showing the second traction test in progress. FIG. 18 shows that the shoe 1698 has slid forward 1801 on the surface 1602, but the traction of the outer sole 1699 has overcome the slip and has arrested the forward motion of the shoe 1698. FIG. 18 shows that the ankle 1443 has further hinged at hinge 1445, simulating the action of a real human ankle.

Figure 19:
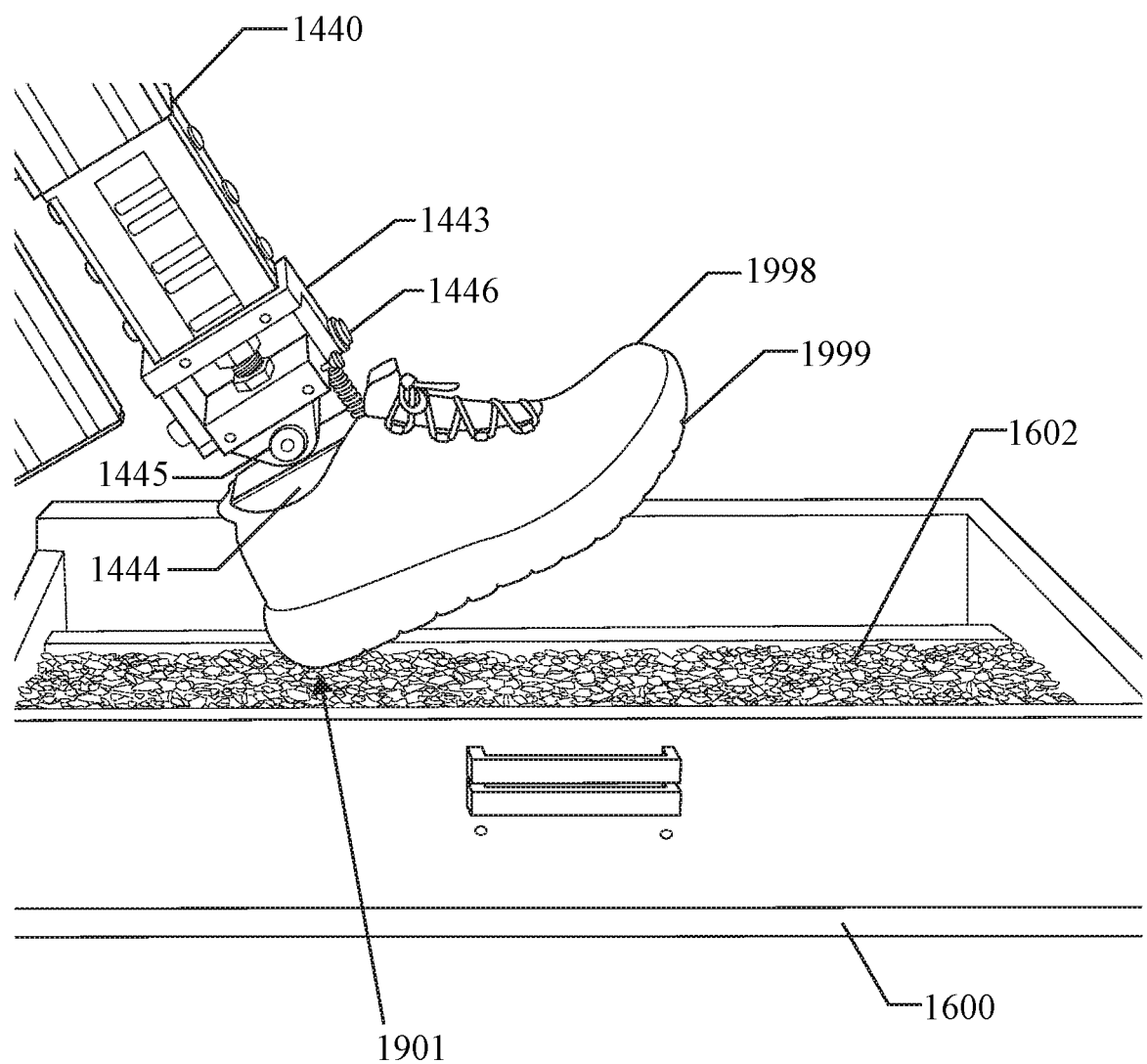
FIG. 19 is an illustration of a side view of one embodiment of the shoe traction testing device showing a third traction test in progress.

FIG. 19 is an illustration of a side view of one embodiment of the shoe traction testing device showing a third traction test in progress. FIG. 19 shows that shoe a 1998 with an outer sole 1999, may be donned by the replica foot 1444. The replica foot 1444 may be connected to the articulating ankle 1443, which has hinges 1445 and 1446, which may allow the ankle 1443 to articulate on two planes, which may increase the biofidelity of the traction measuring device. FIG. 19 shows that the piston has moved the front leg assembly 1440 downward to point 1901, such that outer sole 1999 has contacted surface 1602, which may be on top of force plate 1600.

Figure 20:
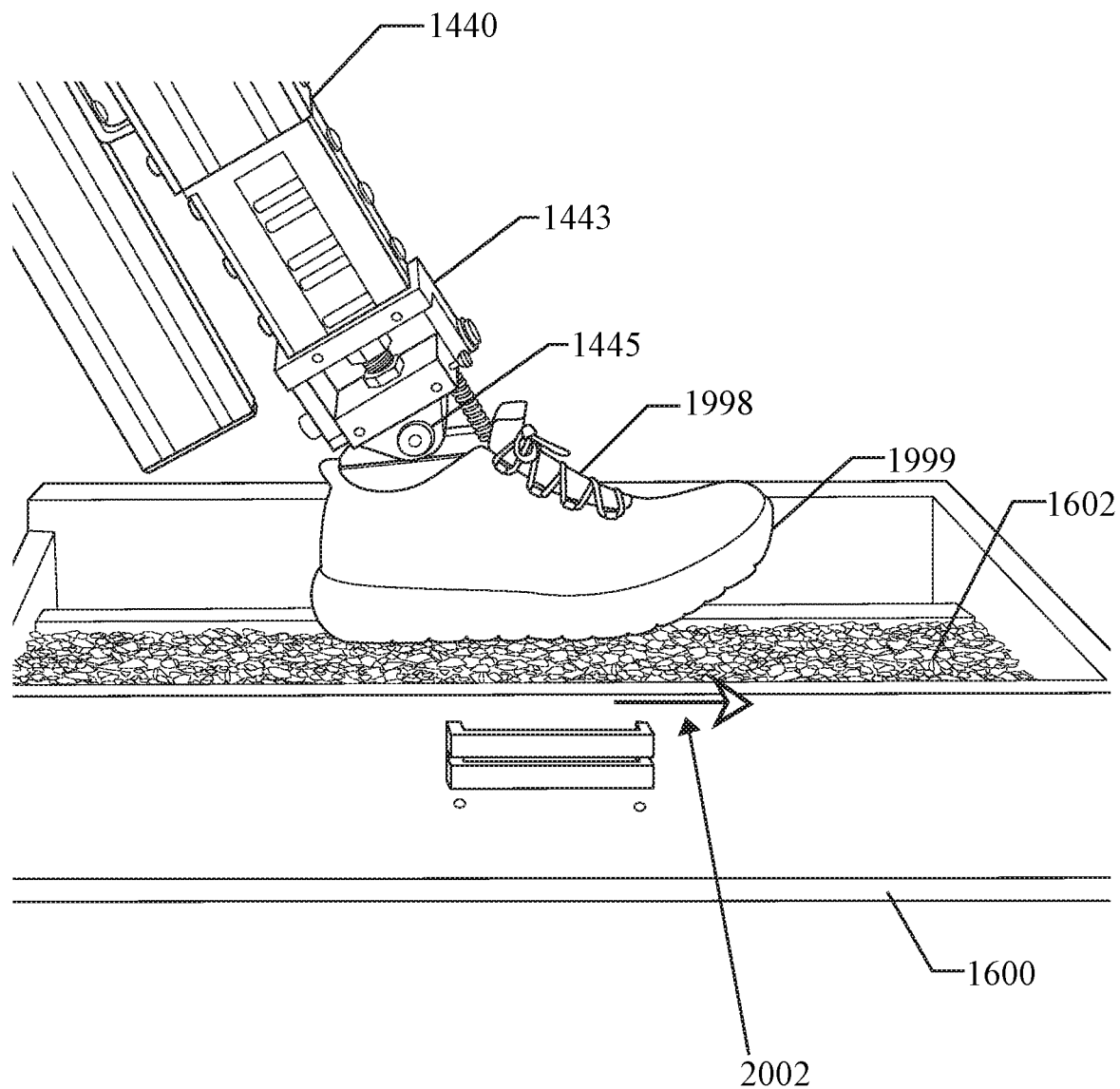
FIG. 20 is an illustration of a side view of one embodiment of the shoe traction testing device showing the third traction test in progress.

FIG. 20 is an illustration of a side view of one embodiment of the shoe traction testing device showing the third traction test in progress. FIG. 20 shows that the ankle 1443 has hinged at hinge 1445, such that the sole 1999 has substantially contacted surface 1602. The traction of the sole 1999 has not stopped the shoe 1998 from sliding 2002 on surface 1602.

Figure 21:
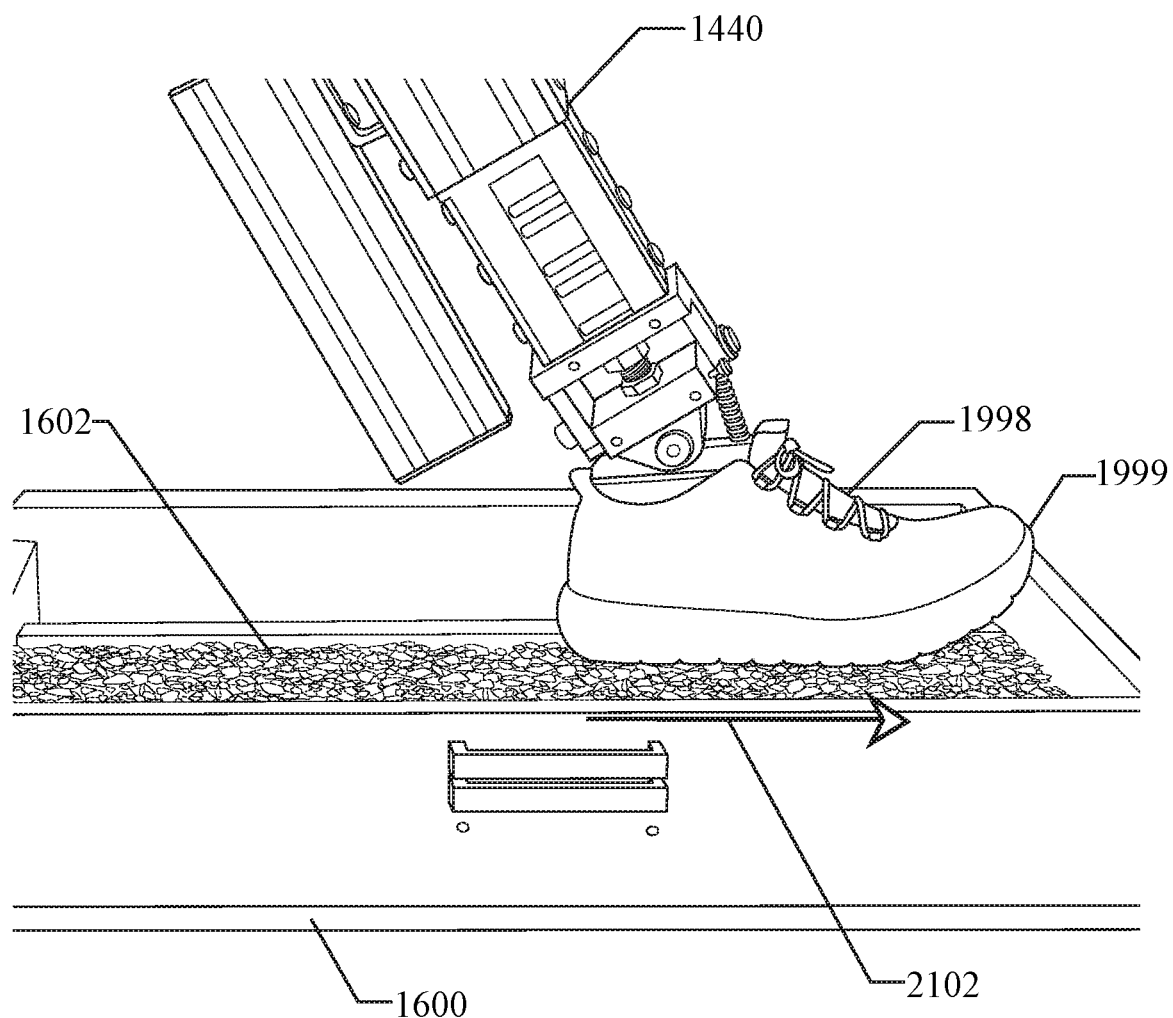
FIG. 21 is an illustration of a side view of one embodiment of the shoe traction testing device showing the third traction test in progress.

FIG. 21 is an illustration of a side view of one embodiment of the shoe traction testing device showing the third traction test in progress. FIG. 21 shows that the traction of the shoe 1998 failed to stop the shoe 1998 from sliding 2102 on surface 2102.

Figure 22:
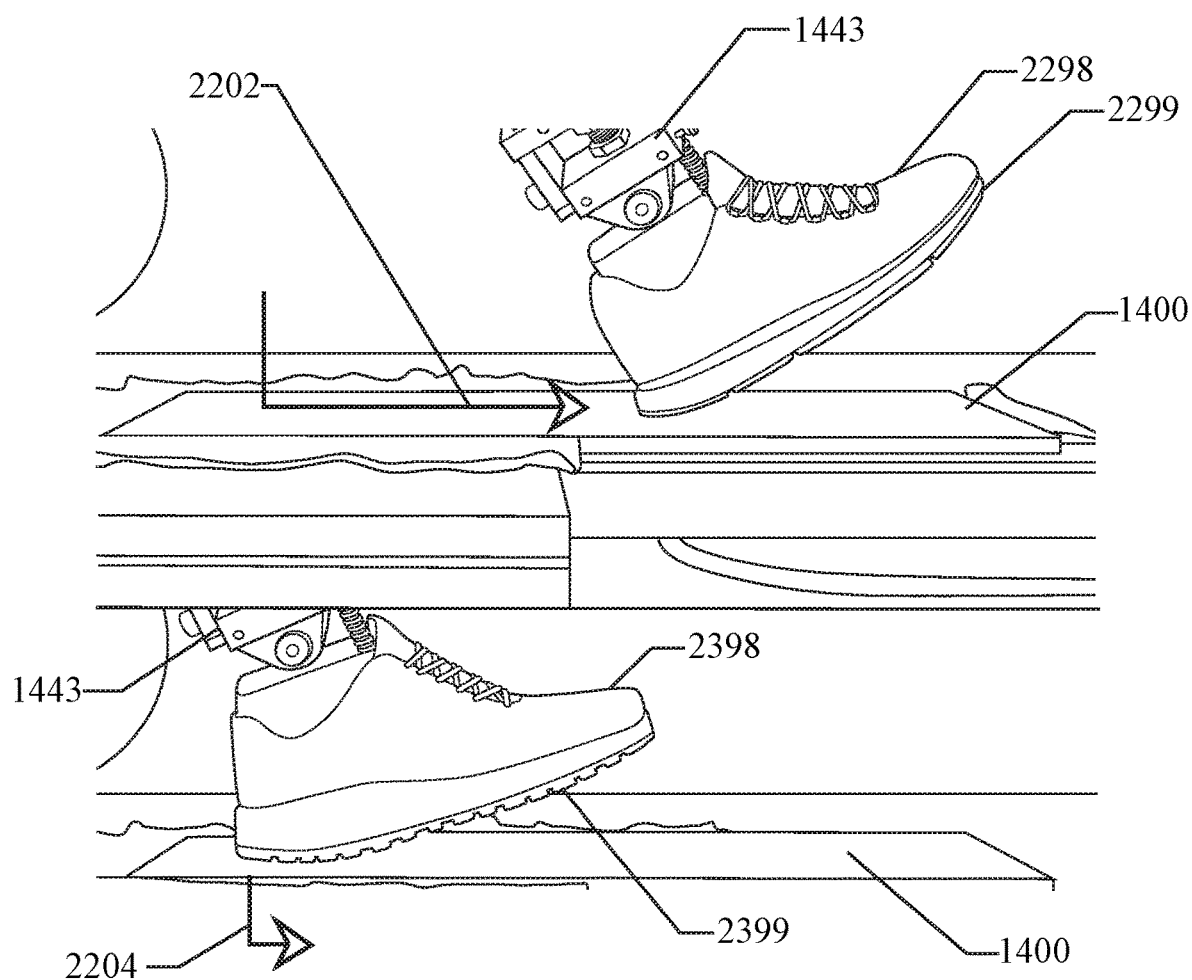
FIG. 22 is an illustration of a side-split view of one embodiment of the shoe traction testing device showing two different traction tests in progress.

FIG. 22 is an illustration of a side-split view of one embodiment of the shoe traction testing device showing two different traction tests in progress. FIG. 22 shows that shoe 2298 slipped 2202 on the force plate 1400, whereas shoe 2398, at the same time point, did not slip. Thus, the traction of outer sole 2399 is better than that of outer sole 2299.

Figure 23:
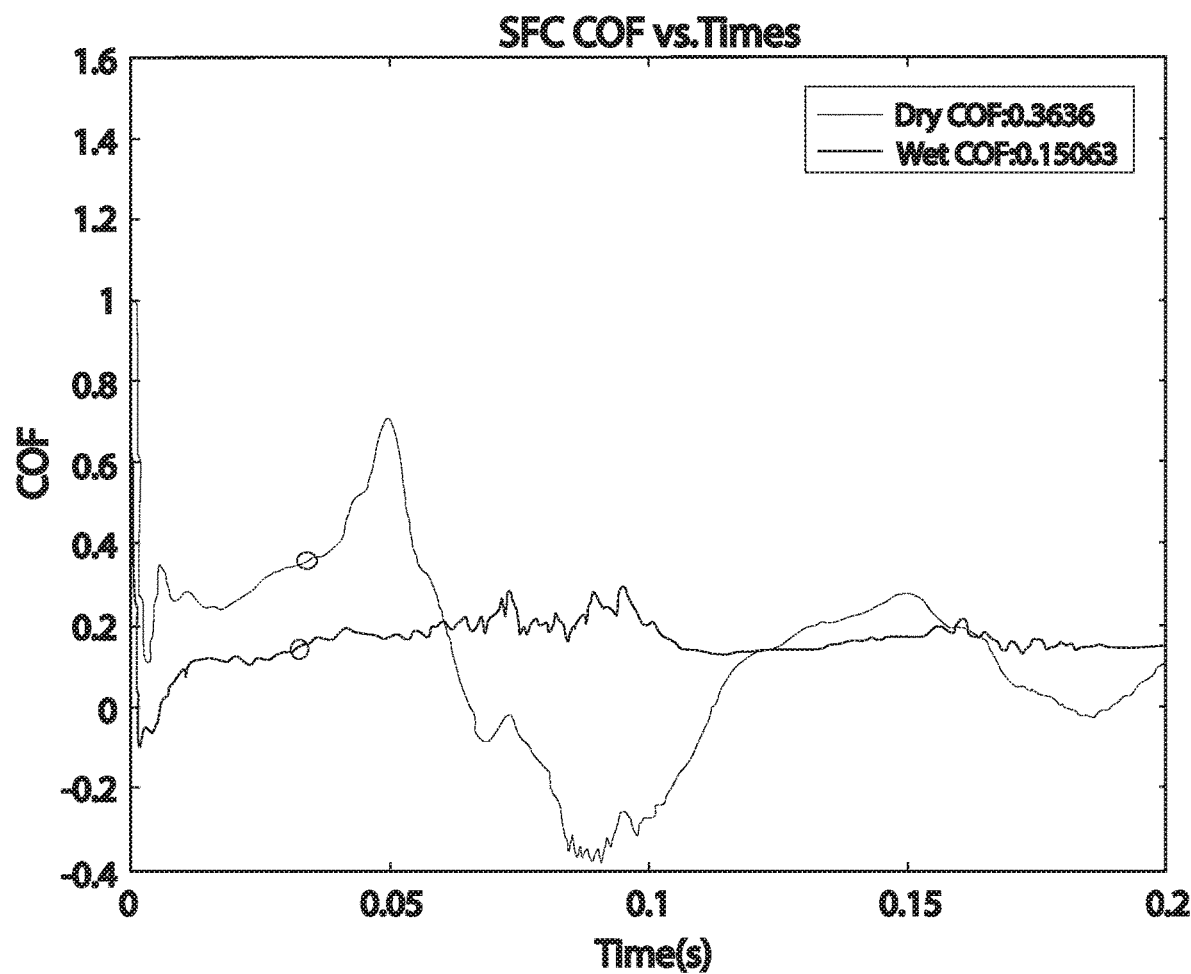
FIG. 23 is an illustration of graph showing the measured coefficient of friction for the same shoe under wet and dry conditions, as tested by the device of the present disclosure.

FIG. 23 is an illustration of graph showing the measured coefficient of friction for the same shoe under wet and dry conditions, as tested by the device of the present disclosure. FIG. 23 shows that the traction of the shoe being tested did not fail in dry conditions but failed in wet conditions ½ second into the test.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A shoe traction testing and measuring device, comprising:
    a base frame;
    a rear leg assembly;
    a front leg assembly;
    a hip joint; and
    a piston;
    wherein said piston is connected to said base frame and said rear leg assembly;
    wherein a lower portion of said rear leg assembly is connected to said base frame and an upper portion of said rear leg assembly is connected to an upper portion of said front leg assembly at said hip joint;
    wherein said front leg assembly comprises an articulating ankle and a replica foot;
    wherein said replica foot is configured to don a shoe; and
    wherein when said piston actuates forward, said upper portion of said rear leg assembly tilts forward, which causes said front leg assembly to move forward and downward, simulating a step of a human, which causes said shoe on said replica foot to contact a force plate or a surface that is on top of said force plate.

2. The shoe traction testing and measuring device of claim 1, wherein a traction of an outer sole of said shoe is measured when said shoe contacts said force plate or said surface that is on top of said force plate.

3. The shoe traction testing and measuring device of claim 1, further comprising:
a foot rest;
wherein said foot rest positions said front leg assembly above said force plate.

4. The shoe traction testing and measuring device of claim 3, wherein said foot rest comprises a wheel;
wherein said wheel is configured to position said front leg assembly above said force plate.

5. The shoe traction testing and measuring device of claim 4, wherein said foot rest is connected to said base frame.

6. The shoe traction testing and measuring device of claim 1, wherein said articulating ankle is adjustable, such that said replica foot has at least two positions: a toe side forward position and an outer side forward position.

7. The shoe traction testing and measuring device of claim 6, wherein said articulating ankle is adjustable by removing said articulating ankle from said front leg assembly, turning said articulating ankle, and reconnecting said articulating ankle to said front leg assembly.

8. The shoe traction testing and measuring device of claim 1, wherein said articulating ankle is configured to hinge on one or more planes.

9. The shoe traction testing and measuring device of claim 8, wherein said articulating ankle is configured to hinge on two planes, which allows said articulating ankle to simulate one or more movements of a human ankle.

10. The shoe traction testing and measuring device of claim 1, further comprising:
a controller;
wherein said controller is in communication with and controls movement of said piston.

11. The shoe traction testing and measuring device of claim 1, wherein said piston is a pneumatic piston.

12. The shoe traction testing and measuring device of claim 1, wherein said piston is an electric actuator.

13. The shoe traction testing and measuring device of claim 1, further comprising:
one or more weights; and
a hip joint axle;
wherein said hip joint axle is configured to rotatably connect to said upper portion of said rear leg assembly and to said upper portion of said front leg assembly; and
wherein said one or more weights engage with said hip joint axle, such that when said replica foot contacts a force plate or a surface that is on top of said force plate, said one or more weights simulates a weight of said human during said step.

14. A shoe traction testing and measuring device, comprising:
a rear leg assembly;
a front leg assembly;
a hip joint; and
a piston;
wherein said piston is connected to a base frame and said rear leg assembly;
wherein a lower portion of said rear leg assembly is connected to said base frame and an upper portion of said rear leg assembly is connected to an upper portion of said front leg assembly at said hip joint;
wherein said front leg assembly comprises an articulating ankle and a replica foot;
wherein said replica foot is configured to don a shoe; and
wherein when said piston actuates forward, said upper portion of said rear leg assembly tilts forward, which causes said front leg assembly to move forward and downward, simulating a step of a human, which causes said shoe on said replica foot to contact a force plate or a surface that is on top of said force plate;
wherein a traction of an outer sole of said shoe is measured when said shoe contacts said force plate or said surface that is on top of said force plate.

15. The shoe traction testing and measuring device of claim 14, further comprising:
a foot rest;
wherein said foot rest positions said front leg assembly above said force plate;
wherein said foot rest is connected to said base frame.

16. The shoe traction testing and measuring device of claim 15, wherein said articulating ankle is adjustable, such that said replica foot has at least two positions: a toe side forward position and an outer side forward position;
wherein said articulating ankle is configured to hinge on two planes, which allows said articulating ankle to simulate one or more movements of a human ankle.

17. The shoe traction testing and measuring device of claim 14, further comprising:
a controller;
wherein said controller is in communication with and controls movement of said piston.

18. The shoe traction testing and measuring device of claim 14, wherein said piston is a pneumatic piston.

19. The shoe traction testing and measuring device of claim 14, further comprising:
one or more weights; and
a hip joint axle;
wherein said hip joint axle is configured to rotatably connect to said upper portion of said rear leg assembly and to said upper portion of said front leg assembly;
wherein said one or more weights engage with said hip joint axle, such that when said replica foot contacts a force plate or a surface that is on top of said force plate, said one or more weights simulates a weight of said human during said step.

20. A shoe traction testing and measuring device, comprising:
a base frame;
a rear leg assembly;
a front leg assembly;
a hip joint, wherein said hip joint comprises a hip joint axle;
a foot rest, wherein said foot rest is connected to said base frame and comprises a wheel;
a piston;
one or more weights; and
a controller, wherein said controller is in communication with and controls movement of said piston;
wherein said piston is connected to said base frame and said rear leg assembly;
wherein a lower portion of said rear leg assembly is connected to said base frame and an upper portion of said rear leg assembly is connected to an upper portion of said front leg assembly at said hip joint via said hip joint axle;
wherein said front leg assembly comprises an articulating ankle and a replica foot;
wherein said replica foot is configured to don a shoe;
wherein when said piston actuates forward, said upper portion of said rear leg assembly tilts forward, which causes said front leg assembly to move forward and downward, simulating a step of a human, which causes said shoe on said replica foot to contact a force plate or a surface that is on top of said force plate;

wherein a traction of an outer sole of said shoe is measured when said shoe contacts said force plate or said surface that is on top of said force plate;

wherein said wheel is configured to position said front leg assembly above said force plate;

wherein said foot rest is connected to said base frame;

wherein said articulating ankle is adjustable, such that said replica foot has at least two positions: a toe side forward position and an outer side forward position;

wherein said articulating ankle is configured to hinge on two planes, which allows said articulating ankle to simulate one or more movements of a human ankle;

wherein said one or more weights engage with said hip joint axle, such that when said replica foot contacts a force plate or a surface that is on top of said force plate, said one or more weights simulates a weight of said human during said step;

wherein weight of said simulated human is in the range of 130 to 180 pounds;

wherein said rear leg assembly and said front leg assembly have an angle range of 10°-20°;

wherein shoe traction testing and measuring device simulates a walking speed of 1.0 to 1.3 m/s;

wherein shoe traction testing and measuring device allows for a slipping motion;

wherein shoe traction testing and measuring device has an inverted pendulum walking motion; and wherein said articulating ankle has an angle range on each of said two planes of 2°-30°.

* * * * *